(12) United States Patent
Chang et al.

(10) Patent No.: US 8,837,124 B2
(45) Date of Patent: Sep. 16, 2014

(54) HOLDING DEVICE FOR HOLDING MOBILE PRODUCTS

(75) Inventors: Ching-Sung Chang, New Taipei (TW); Shih-Chin Tseng, New Taipei (TW); Ju-Nan Chang, New Taipei (TW); Chen-Chen Liu, New Taipei (TW); Qi Liu, Shanghai (CN)

(73) Assignees: Inventec Appliances (Shanghai) Co., Ltd., Shanghai (CN); Inventec Appliances Corp., New Taipei (TW)

( * ) Notice: Subject to any disclaimer, the term of this patent is extended or adjusted under 35 U.S.C. 154(b) by 231 days.

(21) Appl. No.: 13/480,859

(22) Filed: May 25, 2012

(65) Prior Publication Data

US 2012/0300376 A1 Nov. 29, 2012

(30) Foreign Application Priority Data

May 26, 2011 (CN) .......................... 2011 1 0137837

(51) Int. Cl.
*G06F 1/16* (2006.01)

(52) U.S. Cl.
CPC ............ *G06F 1/1626* (2013.01); *G06F 1/1632* (2013.01)
USPC ................... 361/679.01; 455/575.3; 345/179; 439/521

(58) Field of Classification Search
USPC ........ 455/575.4, 575.3, 550.1, 558, 347, 419, 455/51, 556, 418, 517, 435.3, 127.4, 127.1, 455/310, 412.1; 345/173, 690, 102, 76, 1.1, 345/204, 420, 207, 156, 419, 212, 633, 179, 345/161; 361/679.55, 679.56, 679.01, 361/679.29, 679.2, 679.02, 679.31, 679.58, 361/679.23, 679.49, 679.41, 679.33, 361/679.38, 679.46, 679.48; 439/521, 369, 439/367, 152; 248/27.1, 229.12, 316.4, 248/316.7, 176.3, 157, 346.01

See application file for complete search history.

(56) References Cited

U.S. PATENT DOCUMENTS

| | | | | |
|---|---|---|---|---|
| 2006/0238968 | A1* | 10/2006 | Maatta et al. | ................. 361/683 |
| 2009/0048006 | A1* | 2/2009 | Liao et al. | ................. 455/575.3 |
| 2010/0267428 | A1* | 10/2010 | Wang et al. | ................. 455/575.4 |
| 2011/0074709 | A1* | 3/2011 | Cheng et al. | ................. 345/173 |

* cited by examiner

*Primary Examiner* — Hung Duong
(74) *Attorney, Agent, or Firm* — Wang Law Firm, Inc.; Li K. Wang; Stephen Hsu

(57) ABSTRACT

A holding device for mobile products includes a first holding frame and a second holding frame, and the first holding frame is provided for holding a first mobile product and the second holding frame is provided for holding a second mobile product. The first holding frame and the second holding frame are configured to be electrically connected by a wire connection or a wireless connection. When the first holding frame and the second holding frame are holding the first and second mobile products respectively, the mobile products can be electrically connected through the first holding frame and the second holding frame to add functionality to each of the mobile products.

19 Claims, 23 Drawing Sheets

HOLDING DEVICE FOR HOLDING MOBILE PRODUCTS

CROSS-REFERENCE TO RELATED APPLICATION

This application claims the benefit of China Patent Application No. 201110137837.7, filed on May 26, 2011, in the State Intellectual Property Office of the People's Republic of China, the disclosure of which is incorporated herein in its entirety by reference.

BACKGROUND OF THE INVENTION

1. Field of the Invention

The present invention relates to a holding device, in particular to the holding device for holding mobile products.

2. Description of the Related Art

In recent year, European, American, Japanese and Korean manufacturers spare no effort to develop and promote mobile products including mobile phones, palm game players, tablet PCs or notebook computers, and these mobile products have become popular portable electronic products.

With reference to FIG. 1 for a dual-screen game player introduced to the market, the dual-screen game player 1' comprises a first screen 11', a second screen 12' and a fixing element 13'. The fixing element 13' is coupled to the first screen 11' and the second screen 12'. The first screen 11' comprises at least one game character 112'. The second screen 12' comprises a plurality of control buttons 122'. The users can operate the control buttons 122' of the second screen 12' to control the game character 112' of the first screen 11' to maintain the vision integrity of the first screen 11'.

However, such design results in the incapability of replacing the first screen 11' and the second screen 12' due to the fixation by the fixing element 13', and thus the function is limited. In addition, the dual-screen game player 1' is used without additional device protection mechanism, so that if the game player 1' is slid from a user, the dual-screen game player 1' will be dropped on the floor directly and damaged by hitting.

Various mobile products such as the aforementioned mobile phones, palm game players, tablet PCs or notebook computers have pros and cons on their uses and applications. For example, mobile phones or game players have better portability, and notebook computers have a relatively lower portability than others. As to tablet PCs, because of using a touch screen, users generally do not need to connect computer peripherals such as an external keypad or a mouse to enhance the portability. As to safety and stability, notebook computers are safer, and the tablet PCs comes second. However, the mobile phones or game players have a smaller volume, and thus it may be damaged easily when dropped. As to the expandability, the mobile phones or game players cannot be expanded easily, but the tablet PCs or notebook computers can be expanded or connected externally for different functions easily. In addition, the notebook computers have better system integrity, but the other three types have limited system integrity.

Particularly, the screen and the operating interface of the tablet PC are situated on the same plane, so that when a user uses the tablet PC to execute the program, the user's finger will block part of the screen to create a blind spot or a selected portion of the screen of the tablet PC will indirectly reduce the visual space of the screen in use. Thus, users cannot enjoy a larger screen while playing games. Obviously, such application is inconvenient.

With reference to FIG. 1 for a conventional dual-screen mobile product, this product cannot be applied to various mobile products such as mobile phones, notebook computers, keypads or game players. The function of a single mobile product is simpler and lacks of integrity when the mobile product is not combined with other mobile products. Therefore, the tablet PC lacks of an external keypad and results in having the aforementioned drawbacks of covering a portion of the screen and causing blind spots. Furthermore, when a user carries a plurality of mobile products, these individual mobile products will be inconvenient for the user to carry.

Even more, when the mobile products are combined, the combination is a fixed combination and cannot be changed flexibly. The aforementioned dual-screen game player is used as an example, wherein the first screen 11' and the second screen 12' are fixed by the fixing element 13'. The first screen 11' and the second screen 12' can only be turned around the axis of the fixing element 13' to be opened or closed. Thus, the user cannot move the first screen 11' in any other ways with respect to the second screen 12'.

In summary, it is necessary to propose a holding device for mobile products that is provided with the function of the required expandability and protection. The holding device for mobile products not only meets the user's requirements for easy carry, safety and stability, flexible combination, and system integrity, but also overcomes the known limitations of combining a mobile product with other devices.

In view of the aforementioned drawbacks of the prior art, the inventor of the present invention designed a holding device for mobile products to overcome the drawbacks of the prior art.

SUMMARY OF THE INVENTION

In view of the aforementioned problem, it is an objective of the present invention to provide a holding device for mobile products, and the holding device with the expandability and protection function can overcome the limitation of expandability of the mobile products.

To achieve the foregoing objective, the present invention provides a holding device for mobile products, comprising a first holding frame, a second holding frame and at least one connective element. The first holding frame has a first containing groove on which a first port is disposed, wherein the first port is configured to connect the first holding frame and a first mobile product. The second holding frame has a second containing groove on which a second port is disposed, wherein the second port is configured to connect the second holding frame and a second mobile product. The at least one connective element is configured to electrically connect the first holding frame and the second holding frame. When the first holding frame and the second holding frame are electrically connected, the first mobile product in the first containing groove and the second mobile product in the second containing groove are capable of being electrically connected through their connection to the first holding frame and the second holding frame respectively.

In an embodiment, the connective element comprises a connective element main part and has a pivot part or a pivot end fit to be disposed on an end of the connective element main part and on which the first holding frame or the second holding frame is fit to turn.

In an embodiment, the connective element comprises a connective element main part and has a stretch end fit to be disposed in at least one stretch concavity formed on a side of the second holding frame. Instead of the stretch end, the connective element may include a stretchable part fit to be disposed in at least one stretch concavity formed on a side of the second holding frame. Further, the stretch end may be coupled to an inside wall of the stretch concavity, a retracting mechanism may be disposed on the inside wall, and the retracting mechanism may enable selectively stretching or retracting the connective element main part in the stretch concavity to adjust a length of the connective element main part beyond the stretch concavity.

To achieve the foregoing objective, the present invention further provides a holding device for holding mobile products, comprising a first holding frame and a second holding frame. The first holding frame is provided for holding a first mobile product. The second holding frame is provided for holding a second mobile product. And the first holding frame and the second holding frame are configured to be electrically connected with each other by a wire connection or a wireless connection.

In an embodiment, for the first holding frame and the second holding frame to be electrically connected by a wireless connection, the holding device further comprises at least one connective wireless element including a connective wireless element main part and a stretch end fit to be disposed in at least one stretch concavity formed on a side of the second holding frame. Instead of the stretch end, the connective element may include a stretchable part fit to be disposed in at least one stretch concavity formed on a side of the second holding frame. Further, the stretch end may be coupled to an inside wall of the stretch concavity, a retracting mechanism may be disposed on the inside wall, and the retracting mechanism may enable selectively stretching or retracting the connective element main part in the stretch concavity to adjust a length of the connective element main part beyond the stretch concavity.

In an embodiment, the first holding frame has a first containing groove on which a first port is disposed. The first port is configured to connect the first holding frame and the first mobile product. The second holding frame has a second containing groove on which a second port is disposed. The second port is configured to connect the second holding frame and the second mobile product. The holding device further comprises at least one connective wire element configured to make an electrical wire connection between the first holding frame and the second holding frame.

The invention also provides a holding device for holding mobile products which comprises a plurality of holding frames and a plurality of connective elements. Each of the plurality of holding frames has a containing groove on which a port is disposed, wherein the port is configured to connect said each holding frame and an interface of a mobile product. The plurality of connective elements are configured to electrically connect the plurality of holding frames. When the holding frames are electrically connected, mobile products in respective containing grooves of the holding frames are capable of being electrically connected through their connection to the holding frames respectively so as to add functionality to each of the mobile products.

In an embodiment, one of the holding frames further comprises at least two parts fit to be assembled into a unit, and a connective portion fit to connect the two parts, and the containing groove of said one holding frame is to be formed by putting together the two parts.

In summary, the holding device for mobile products in accordance with the present invention has one or more of the following advantages:

(1) The holding device for mobile products in accordance with the present invention combines a plurality of mobile products such as a tablet PC and other corresponding electronic devices. The mobile products can be changed according to user requirements to achieve the effect of functional expansions, so that the system integrity can be increased after several mobile products are combined flexibly.

(2) The holding device for mobile products in accordance with the present invention covers the external side of the mobile product when using to achieve the effect of protecting the mobile products and providing safety for the mobile products.

(3) The holding device for mobile products in accordance with the present invention can hold mobile products such as a tablet PC or any other corresponding electronic products by accommodating the mobile products into the containing groove of a holding frame of the holding device, so that several mobile products can be carried at the same time to improve the simplicity and convenience of carrying the electronic devices.

(4) With the connective element of the present invention, the first holding frame and the second holding frame can be moved in a special way to meet special requirements of the users in addition to the selection of wire connection or wireless connection.

DETAILED DESCRIPTION OF THE PREFERRED EMBODIMENTS

The technical characteristics of the present invention will become apparent with the detailed description of the preferred embodiments accompanied with the illustration of related drawings as follows. It is noteworthy to point out that same numerals are used for representing respective elements for the description of the preferred embodiments and the illustration of the drawings.

Figure 1:
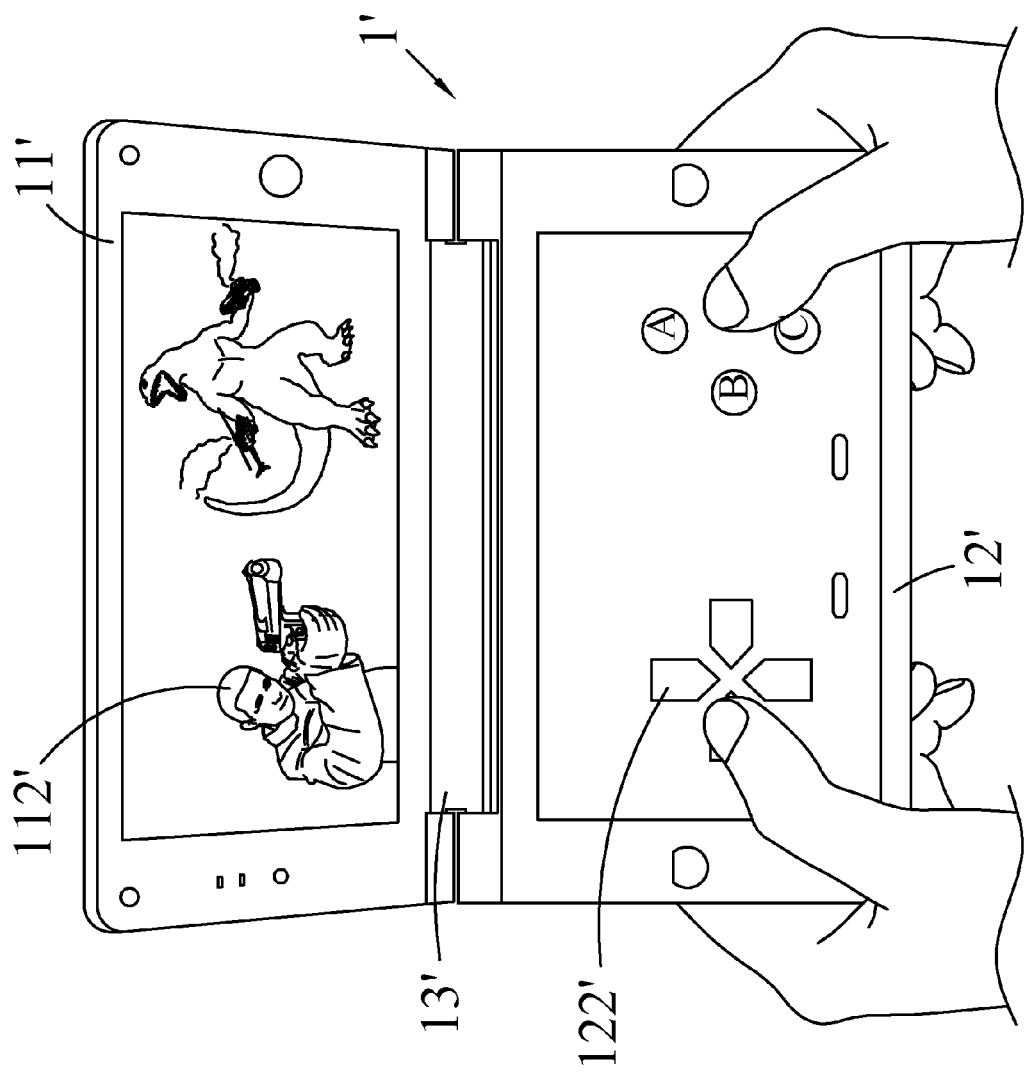
FIG. 1 is a conventional dual tablet PC.
Figure 2:
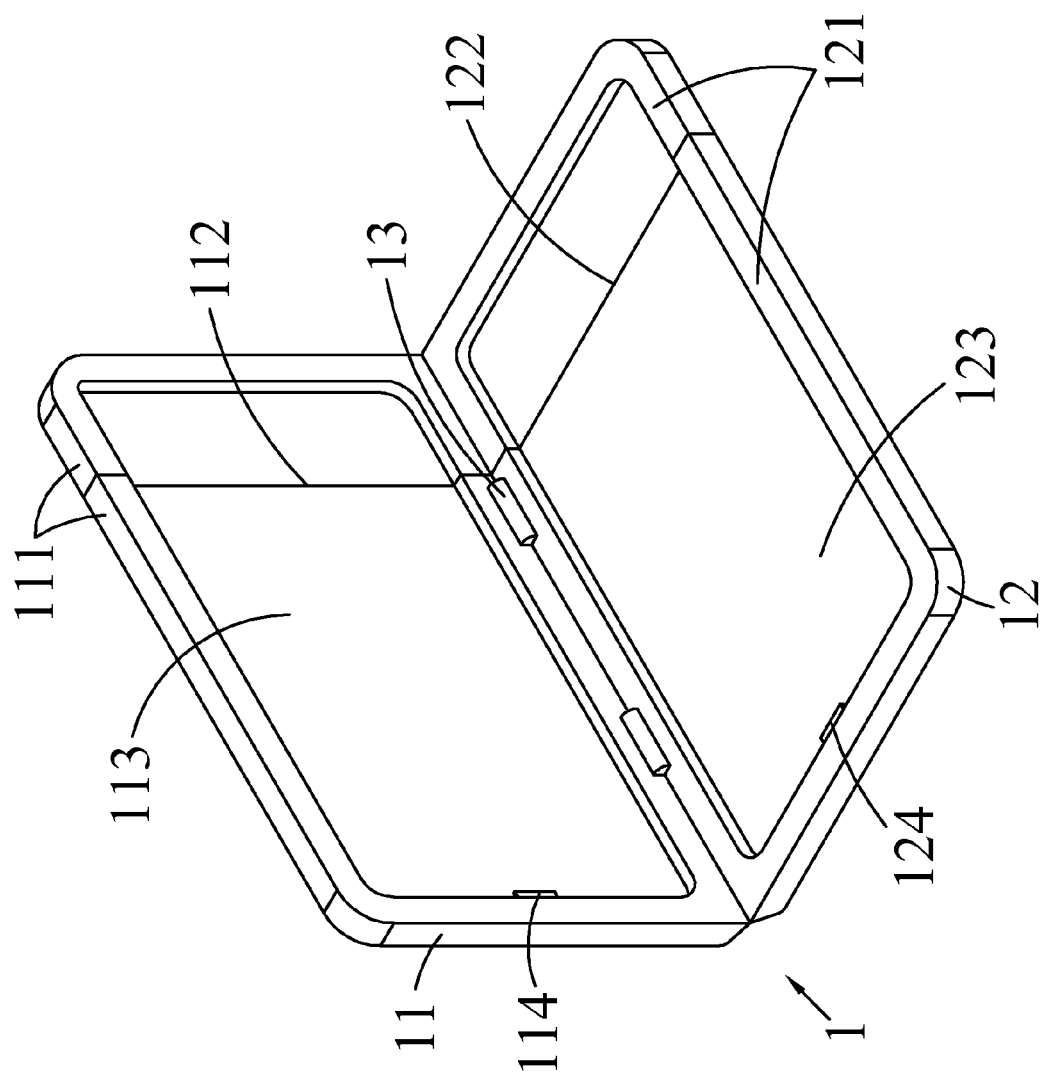
FIG. 2 is a stereogram of a holding device for mobile products in accordance with a first preferred embodiment of the present invention.
Figure 3:
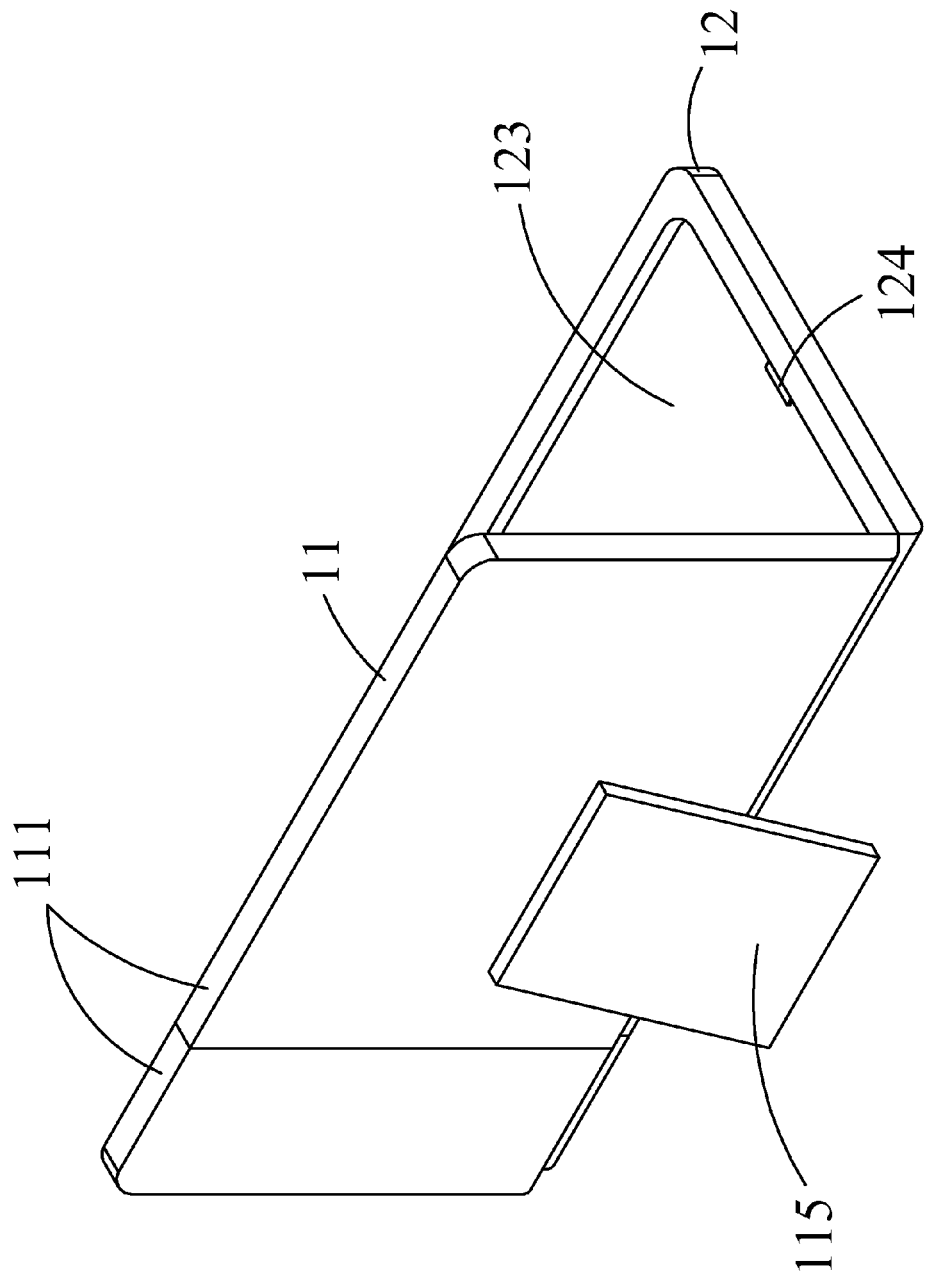
FIG. 3 is another stereogram of a holding device for mobile products in accordance with the first preferred embodiment of the present invention viewed from another angle.
Figure 4:
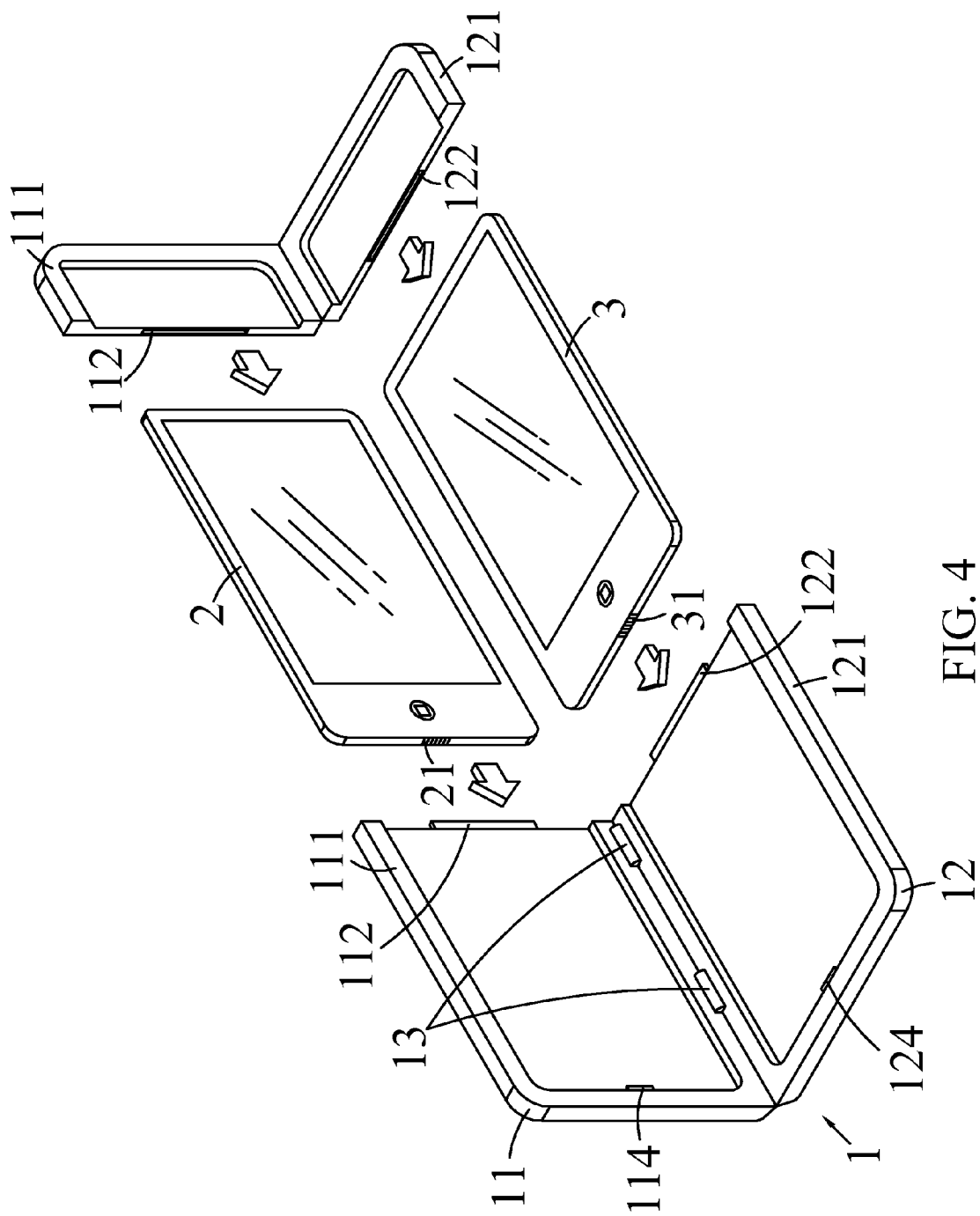
FIG. 4 is an exploded view of a holding device for mobile products in accordance with the first preferred embodiment of the present invention.

With reference to FIGS. 2 to 4 for stereogram views and an exploded view of a holding device for mobile products in accordance with the first preferred embodiment of the present invention respectively, the holding device for mobile products 1 comprises a first holding frame 11, a second holding frame 12 and at least one connective element 13. The first holding frame 11 is connected to the second holding frame 12 by the connective element 13. Preferably, the connective element 13 is not limited to any particular form, and any connection capable of connecting the first holding frame 11 and the second holding frame 12 to form a one-piece component can be used for the present invention. Therefore, the connective element 13 can be a bearing, a slide, a butterfly buckle, a flexible component (such as a flexible tube) or a magnetic connective element (not shown in the figure). In an embodiment, the connective element may include a stretchable part. In addition, the first holding frame 11 and the second holding frame 12 can be made of a material manufactured by a plastic molding process or any other materials. The first holding frame 11 and the second holding frame 12 can be electrically connected by a wire connection or a wireless connection. For the wire connection, an electric wire can be covered by the interior or the exterior of the first holding frame 11, the second holding frame 12 and the connective element 13 (not shown in the figure). For the wireless connection, wireless modules such as the Bluetooth modules can be disposed on the first holding frame 11 and the second holding frame 12. However, the connection and combination of the present invention are not limited to the above arrangements only.

The first holding frame 11 may include a first unit 111, a first connective portion 112, a first containing groove 113 and a first port 114. In this preferred embodiment, the first unit 111 can be a two-piece assembly. However, the quantity of the first units 111 and the size of the two-piece first unit 111 are not limited in practical applications. The two-piece first unit 111 is formed by the connection of the first connective portion 112. Preferably, the form of the first connective portion 112 is not limited, and any forms capable of connecting the two-piece first unit 111 into a one-piece assembly can be applied in the present invention. Therefore, the first connective portion 112 can be a bearing, a slide, a butterfly buckle, a flexible component, or a magnetic connective element (not shown in the figure). The assembled first unit 111 has the first containing groove 113 formed on the first holding frame 11, and the first containing groove 113 is slightly greater than the first tablet PC 2. Of course, the first tablet PC 2 is used as an example for illustrating the invention, and other mobile products (or electronic devices) can be used as well. The first port 114 is disposed on a sidewall of the first containing groove 113, wherein the first port 114 can be a Universal Serial Bus (USB) interface or a fire wire interface (IEEE 1394), but the interface of the first port 114 is not limited to any particular type.

If a user needs to electrically connect the first tablet PC 2 to the first port 114, the user can divide the first unit 111 into two pieces, and use an interface 21 disposed on a side of the first tablet PC 2 to connect to the first port 114 disposed on a sidewall of the first containing groove 113. Then, the two-piece first unit 111 is combined into a one-piece assembly to avoid the inability of successfully combining the interface 21 of the first tablet PC 2 to the first port 114 when the first tablet PC 2 and the first holding frame 11 are assembled, since the first containing groove 113 is only slightly greater than the first tablet PC 2.

With reference to FIG. 4, the second holding frame 12 includes a second unit 121, a second connective portion 122, a second containing groove 123 and a second port 124. In this preferred embodiment, the second unit 121 is a two-piece assembly in the preferred embodiment. However, the quantity of second units 121 and the size of the two-piece second unit 121 are not limited in practical applications. The two-piece second unit 121 is formed by the connection of the second connective portion 122. Preferably, the form of the second connective portion 122 is not limited, and any forms capable of connecting the two-piece second unit 121 into a one-piece assembly can be applied in the present invention. Therefore, the second connective portion 122 can be a bearing, a slide, a butterfly buckle, a flexible component, or a magnetic connective element (not shown in the figure). The assembled second unit 121 has the second containing groove 123 formed on the second holding frame 12, and the second containing groove 123 is slightly greater than second tablet PC 3. The second port 124 is disposed on a sidewall of the second containing groove 123, wherein the second port 124 can be a Universal Serial Bus (USB) interface or a fire wire interface (IEEE 1394), but the interface of the first port 114 is not limited to any particular type.

If a user needs to electrically connect the second tablet PC 3 to the second port 124, the user can divide the second unit 121 into two pieces, and use an interface 31 disposed on a side of the second tablet PC 3 to connect to the second port 124 disposed on a sidewall of the second containing groove 123. Then, the two-piece second unit 121 is combined into a one-piece assembly to avoid the inability of successfully combining the interface 31 of the second tablet PC 3 to the second port 124 when the second tablet PC 3 and the second holding frame 12 are assembled, since the second containing groove 123 is only slightly greater than the second tablet PC 3.

When the first tablet PC 2 and the second tablet PC 3 are respectively and electrically coupled to the first holding frame 11 and the second holding frame 12, with the combination of the first unit 111 and the second unit 121 from two pieces into a one-piece assembly, the first holding frame 11 and the second holding frame 12 have the function of protecting the first tablet PC 2 and the second tablet PC 3, so as to provide a buffer when an external impact force is exerted onto the tablet PCs 2, 3 to prevent the tablet PCs 2, 3 from being damaged. In addition, the electrical connection technology of provided by the present invention is much better than the prior art, since the present invention not only provides the electrical connection of the first tablet PC 2 and the second tablet PC 3 to achieve the effect of the tablet PCs 2, 3 to support each other, but also allows users to remove the tablet PCs 2, 3 as required.

With reference to FIG. 3 for another stereogram of a holding device for mobile products in accordance with the first preferred embodiment of the present invention from another angle, the holding device for mobile products further comprises a support stand 115 disposed at the first holding frame 11 or the second holding frame 12. In this preferred embodiment, the support stand 115 is disposed at another side of the first holding frame 11 opposite to the first containing groove 113. Similarly, the support stand 115 can be disposed at another side of the second holding frame 12 opposite to the second containing groove 123 in order to provide the function of partially supporting the weight of the tablet PC 2. In the present invention, the included angle between the first holding frame 11 and the second holding frame 12 is not limited to any particular angle, and users can adjust the included angle according to their preference or purpose of using.

Figure 5A:
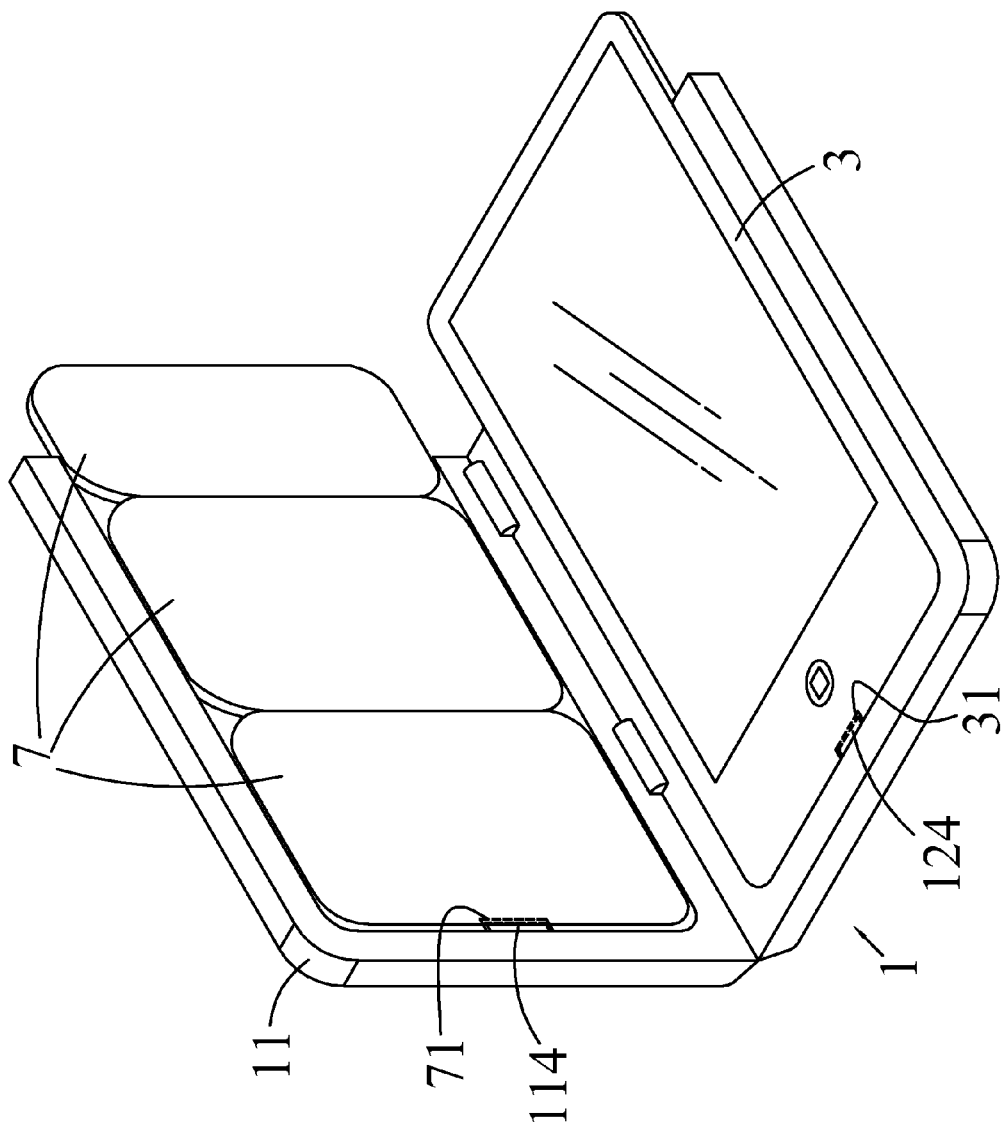
FIG. 5A is a schematic view of a holding device for mobile products in accordance with a second preferred embodiment of the present invention.
Figure 5B:
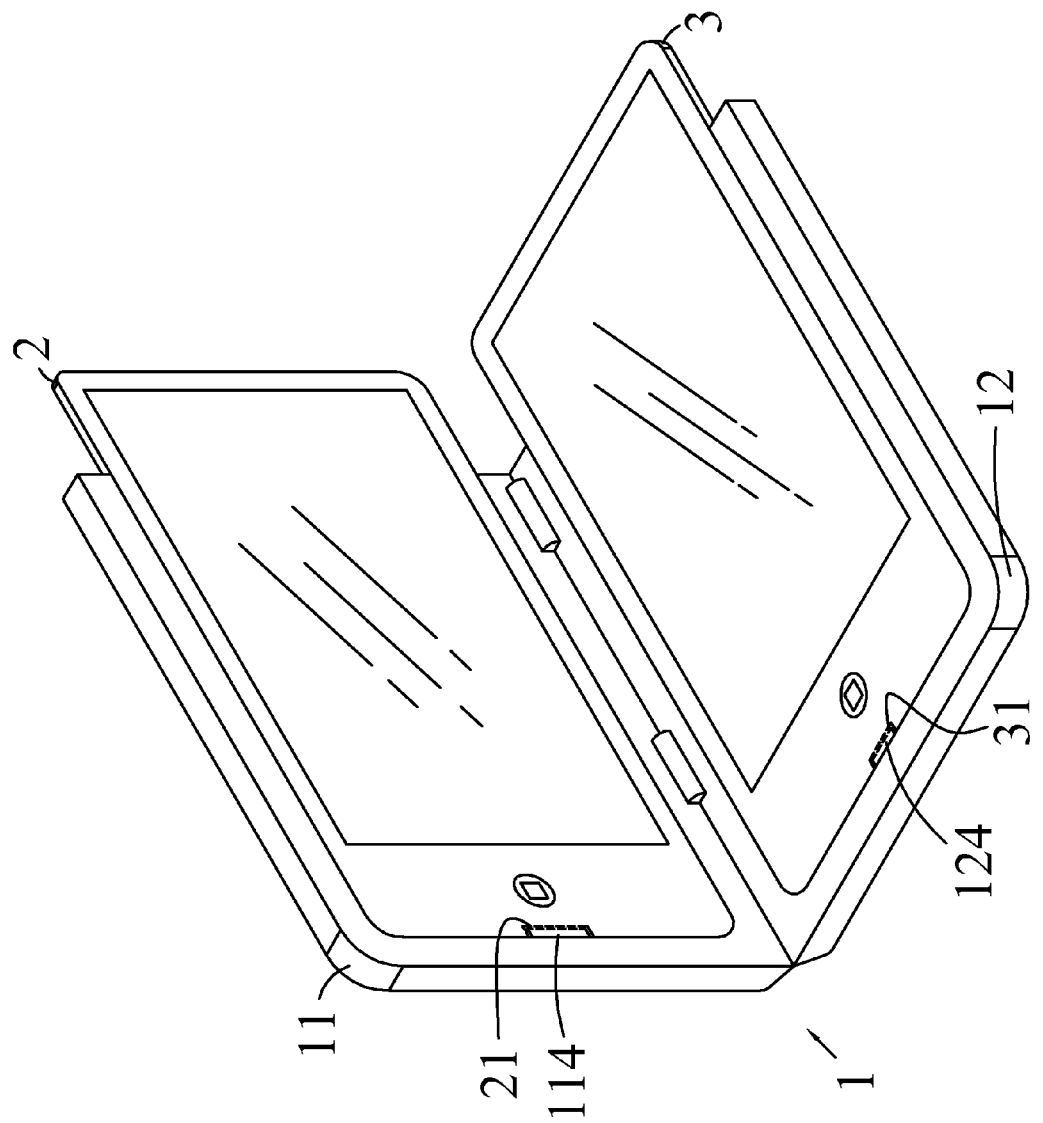
FIG. 5B is a schematic view of a holding device for mobile products in accordance with a third preferred embodiment of the present invention.

In addition, the first holding frame 11 and the second holding frame 12 in the present invention are not necessarily to be two pieces. With reference to FIGS. 5A and 5B for schematic views of a holding device for mobile products in accordance with the second and third preferred embodiments of the present invention respectively, both of the first holding frame 11 and the second holding frame 12 are one piece. In the second preferred embodiment as shown in FIG. 5A, the first port 114 is used to connect an interface 71 of the mobile products 7, and the other mobile products 7 not directly connected to the first port 114 are electrically connected with one another, wherein the mobile products 7 include but not limited to a hard disk, a speaker and a battery. In the third preferred embodiment as shown in FIG. 5B, the preferred embodiment is similar to the first preferred embodiment due to the tablet PCs 2, 3 are connected to the one-piece first holding frame 11 and the one-piece second holding frame 12 respectively.

Figure 6:
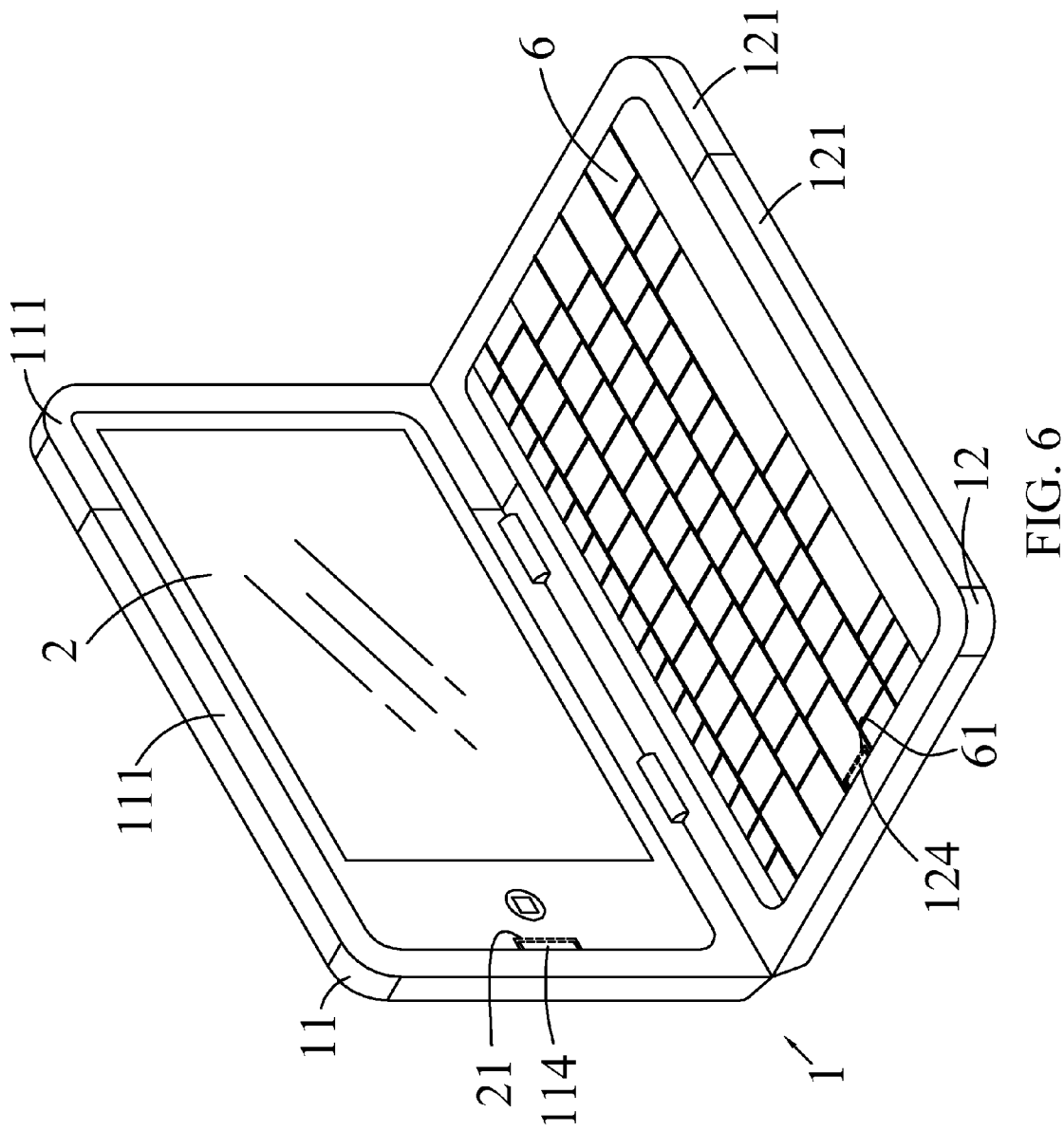
FIG. 6 is a schematic view of a holding device for mobile products in accordance with a fourth preferred embodiment of the present invention.

With reference to FIG. 6 for a schematic view of a holding device for mobile products in accordance with the fourth preferred embodiment of the present invention, the connection of this preferred embodiment is similar to that of the first preferred embodiment of the present invention. In this preferred embodiment, the first port 114 of the first holding frame 11 is connected to the first tablet PC 2, and the second port 124 of the second holding frame 12 is connected to a substantial keyboard 6. After an interface 61 is connected to the second port 124, the present invention may achieve the effect of connecting the tablet PC 2 to the substantial keyboard 6.

Figure 7:
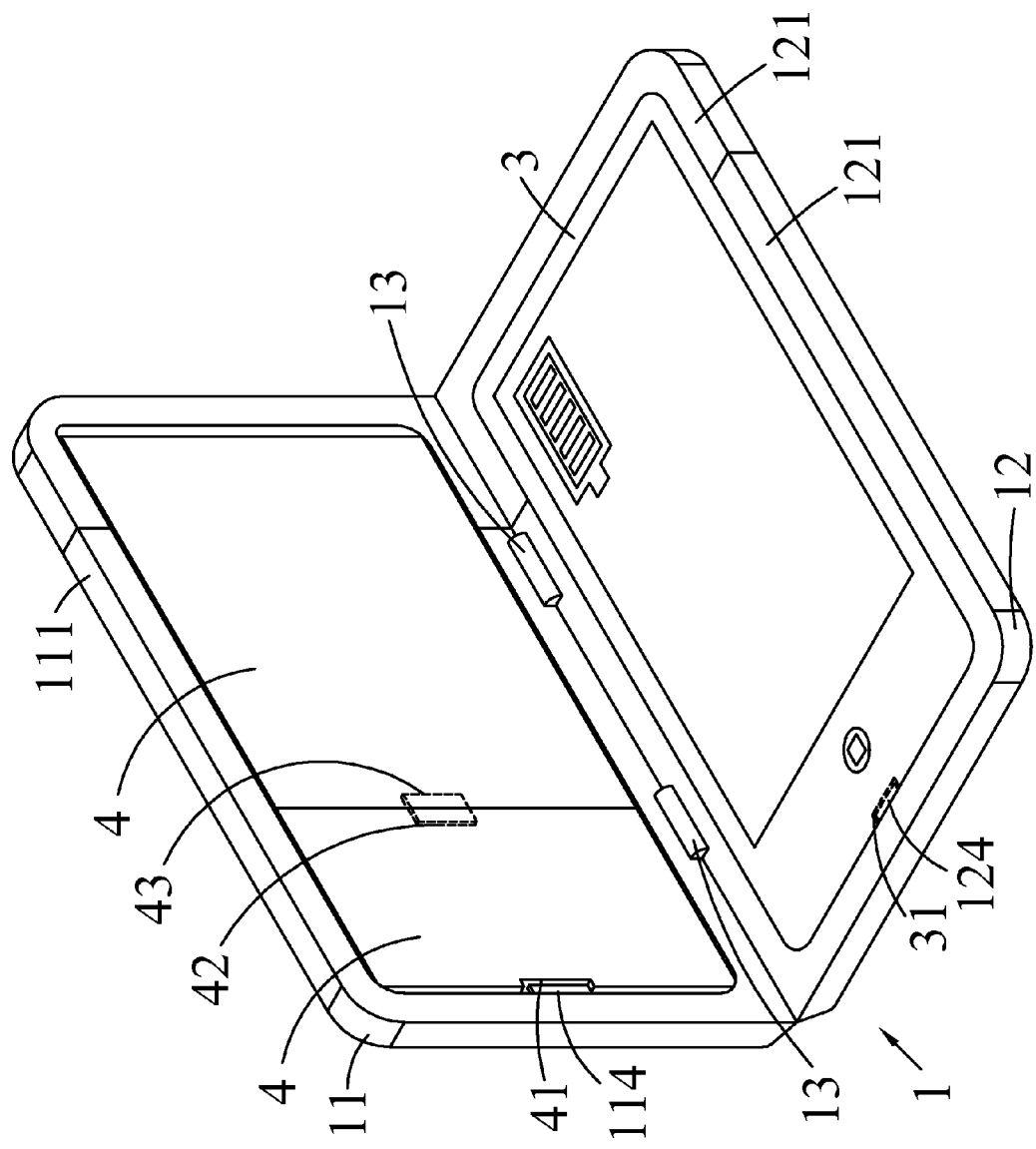
FIG. 7 is a schematic view of a holding device for mobile products in accordance with a fifth preferred embodiment of the present invention.

With reference to FIG. 7 for a schematic view of a holding device for mobile products in accordance with the fifth preferred embodiment of the present invention, the connection of the second holding frame 12 and the second tablet PC 3 of this preferred embodiment is similar to that of the first preferred embodiment, and the first holding frame 11 has a first port 114. In addition, at least one power supply 4 (such as a battery) is provided. In this preferred embodiment, the quantity of power supply 4 is equal to two. However, the quantity is only exemplary but not limited in the present invention. The power supply 4 has an interface 41, and one of the power supplies 4 is electrically connected to the first port 114 of the first holding frame 11 through the interface 41. The power supply 4 connected to the interface 41 further has a first concatenating portion 42, and the first concatenating portion 42 is connected to a second concatenating portion 43 of another power supply 4 to achieve the effect of charging the second tablet PC 3 by the power supply 4.

Figure 8:
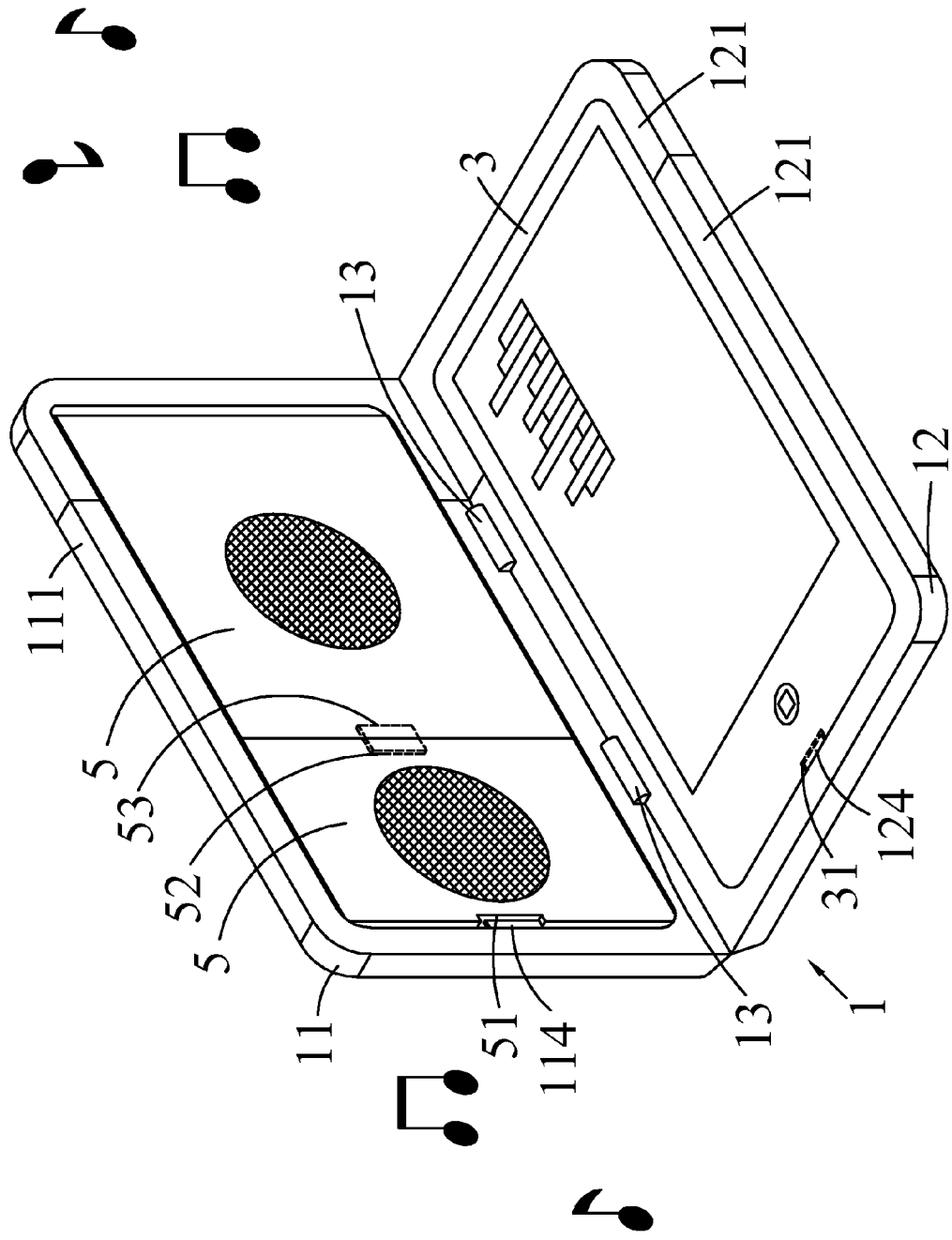
FIG. 8 is a schematic view of a holding device for mobile products in accordance with a sixth preferred embodiment of the present invention.

With reference to FIG. 8 for a schematic view of a holding device for mobile products in accordance with the sixth preferred embodiment of the present invention, the connection of the second holding frame 12 and the second tablet PC 3 of this preferred embodiment is similar to that of the first preferred embodiment, and the first holding frame 11 has a first port 114. In addition, at least one audio device 5 is provided, and the quantity of audio devices 5 in this preferred embodiment is equal to two. However, the quantity is only exemplary but not limited in the present invention. The audio device 5 of this preferred embodiment is a speaker, and the audio device 5 has an interface 51. One of the audio devices 5 is electrically connected to the first port 114 of the first holding frame 11 through the interface 51, and the other audio device 5 connected to the first holding frame 11 further has a first concatenating portion 52. The first concatenating portion 52 is connected to a second concatenating portion 53 of another audio device 5. By using the second tablet PC 3 as a host system, the audio device 5 connected to the present invention provides a better sound effect.

Figure 9:
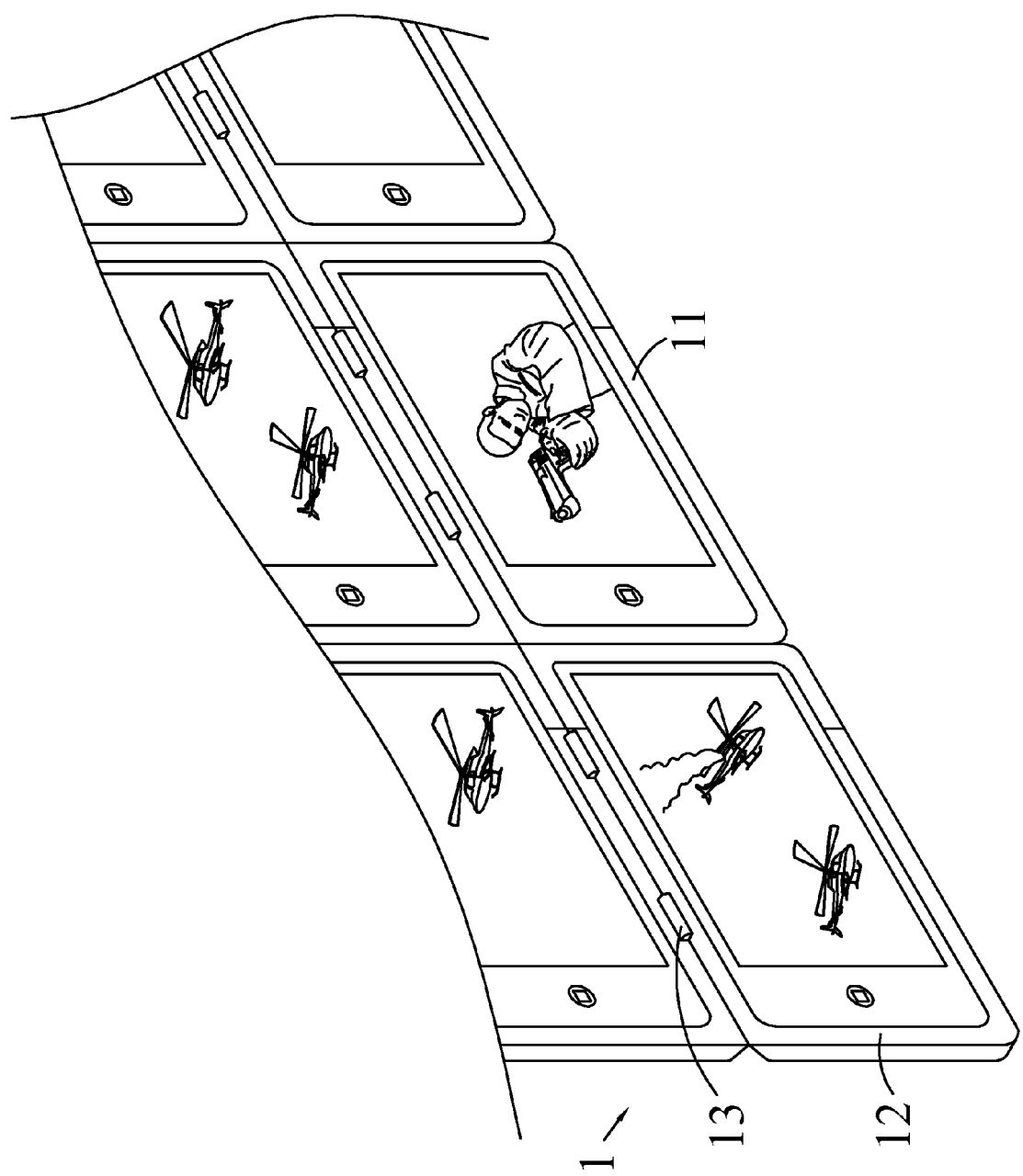
FIG. 9 is a partial schematic view of a holding device for mobile products in accordance with a seventh preferred embodiment of the present invention.

In addition, in the present invention, the holding device for mobile products 1 may not only comprise the first holding frame 11, the second holding frame 12 and the connective element 13. With reference to FIG. 9 for a partial schematic view of a holding device for mobile products in accordance with the seventh preferred embodiment of the present invention, this preferred embodiment further comprises a plurality of holding frames connected to a plurality of tablet PCs in addition to the similar way of the first holding frame 11, the second holding frame 12 and at least one connective element 13 of the first preferred embodiment. In this preferred embodiment, each holding frame is disposed on the same plane and connected closely with one another. The screens of several tablet PCs are connected to be a big screen to substitute the expensive large panel. Of course, the seventh preferred embodiment is provided for the purpose of illustrating the invention only, and the quantity of holding frames can be changed as required. The plural holding frames can be electrically connected with one another by a wire connection or a wireless connection to achieve the purpose of a fully expansion and a system integrity, as described in the first preferred embodiment.

Figure 10:
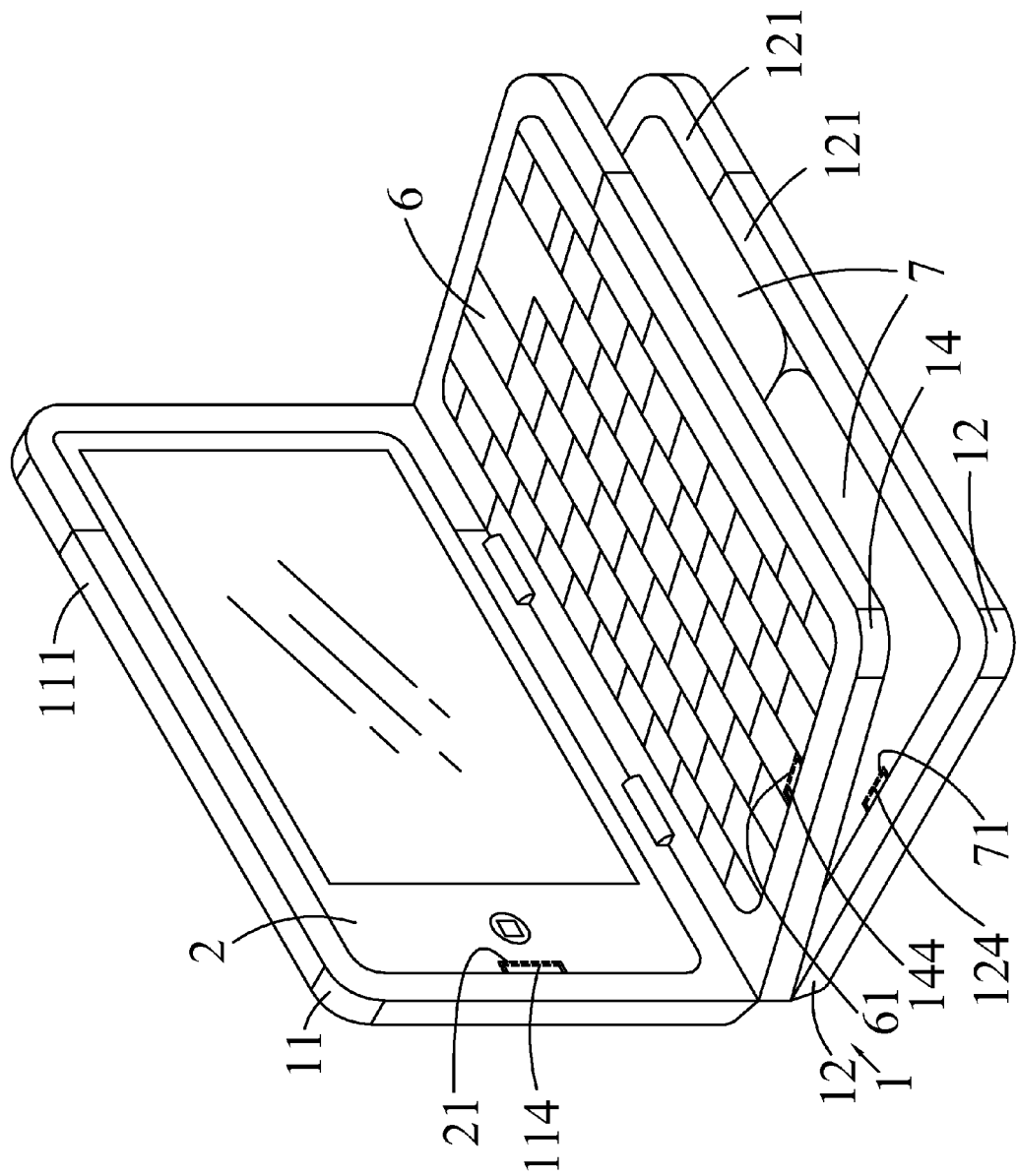
FIG. 10 is a schematic view of a holding device for mobile products in accordance with an eighth preferred embodiment of the present invention.

In addition, the present invention comes with a plurality of holding frames, but the quantity is not limited in the present invention. With reference to FIG. 10 for a schematic view of a holding device for mobile products in accordance with the eighth preferred embodiment of the present invention, the holding device for mobile products comprises a first holding frame 11, a second holding frame 12 and a third holding frame 14. Preferably, the first holding frame 11, the second holding frame 12 and the third holding frame 14 are connected to one another by a connective element to stack or separate them with an included angle (as shown in the figure). The included angle is not limited to any particular angle, and users can make adjustments as needed. The first holding frame 11, the second holding frame 12 and the third holding frame 14 can be electrically connected by a wire connection or a wireless connection as described in the first preferred embodiment, and thus they will not be described again. In this preferred embodiment, the first holding frame 11 and the first tablet PC 2 are connected, and the second holding frame 12 is connected to a plurality of mobile products 7 (such as a speaker and a battery), and the third holding frame 14 is connected to a substantial keyboard 6. Preferably, the third holding frame 14 is connected to the interface 61 of the substantial keyboard 6 through the third port 144. In this preferred embodiment, the first holding frame 11, the second holding frame 12 and the third holding frame 14 can be stacked vertically or in any other way. The plurality of holding frames holds and electrically connects to various mobile products (i.e. electronic devices) to achieve the effect of integrating different mobile products in order to satisfy different user requirements by different configurations. The mobile product mentioned in the present invention can be an electronic device such as a tablet PC, a mobile phone, a power supply, an audio device, a storage device (such as a portable hard disk), an operating device (such as a keyboard), but the invention is not limited to those mentioned above.

In addition, the present invention can achieve the purpose of moving the first holding frame 11 and the second holding frame 12 relatively by the change of the connective element 13. With reference to FIGS. 11A to 11C and 12 for schematic views of a holding device for mobile products, a stretched connective element of the holding device for mobile products, a turned-up first holding frame of a holding device and another schematic view of a holding device for mobile products from another angle in accordance with the ninth preferred embodiment the present invention respectively, the holding device for mobile products 1 comprises a first holding frame 11, a second holding frame 12 and at least one connective element 13a. Preferably, the at least one connective element 13a can be a wire connective element or a wireless connective element. The wire connective element has a substantial circuit electrically coupled thereto; the wireless connective element has no substantial circuit electrically coupled thereto, however, has a substantial connection thereto. The first holding frame 11 and the second holding frame 12 are electrically connected to one another, and the way of the electrical connection includes a wire connection or a wireless connection. The first holding frame 11 is connected to the second holding frame 12 through the connective element 13a. In this preferred embodiment, the first holding frame 11 and the second holding frame 12 have structures similar to those described in the first preferred embodiment. A stretching concavity 125 is formed on a side of the second holding frame 12, and the stretching concavity 125 is formed parallel to the bottom of the second holding frame 12 and extended in a direction of the other side corresponding to an opening of the stretching concavity 125. With reference to FIG. 12, the connective element 13a is provided with a connective element main part 131, a pivot part 132 and a stretch end 133. Preferably, the pivot part 132 can be a pivot end. When the connective element 13a is a wire connective element, the connective element main part 131 contains a substantial circuit wire disposed therein and provided for connecting the mobile products in the first holding frame 11 and the second holding frame 12 to form a wire connection through the connective element 13a; or when the connective element 13a is a wireless connective element, the connective element main part 131 does not contain any substantial circuit wire, and the mobile products connected to the first holding frame 11 and the second holding frame 12 can exchange data through a wireless transmission. The pivot part 132 is situated at an end of the connective element main part 131, and the pivot part 132 can be rotatably connected to a backside of the first holding frame 11 or the second holding frame 12. Preferably, the pivot part 132 can be a bearing, a pivot or an equivalent mechanism, but the present invention is not limited to those mentioned above only. The stretch end 133 is disposed in the stretching concavity 125 of the second holding frame 12, and coupled to a wall of the stretching concavity 125. A retracting mechanism (not shown in the figure) is further disposed on the wall of the stretching concavity 125. The retracting mechanism is provided for selectively stretching or retracting the portion of the connective element main part 131 near the stretching concavity 125 into the stretching concavity 125 to adjust the length of the connective element main part 131 beyond the stretching concavity 125. The design of the aforementioned pivot part 132, stretch end 133, stretching concavity 125 and retracting mechanism is used in this preferred embodiment for illustrating the present invention only, but not intended for limiting the scope of the present invention.

Figure 11A:
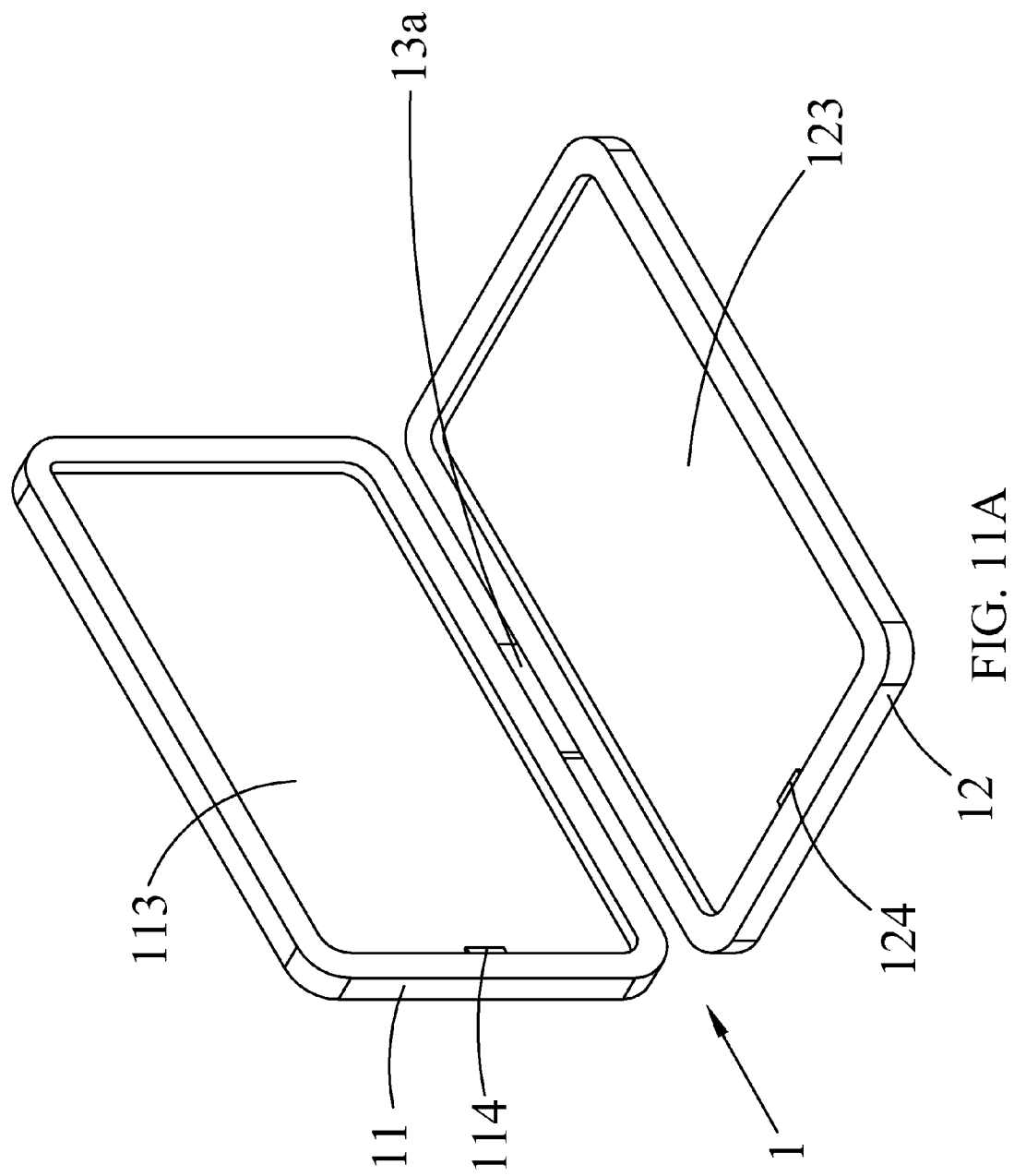
FIG. 11A is a schematic view of a holding device for mobile products in accordance with a ninth preferred embodiment of the present invention.
Figure 11B:
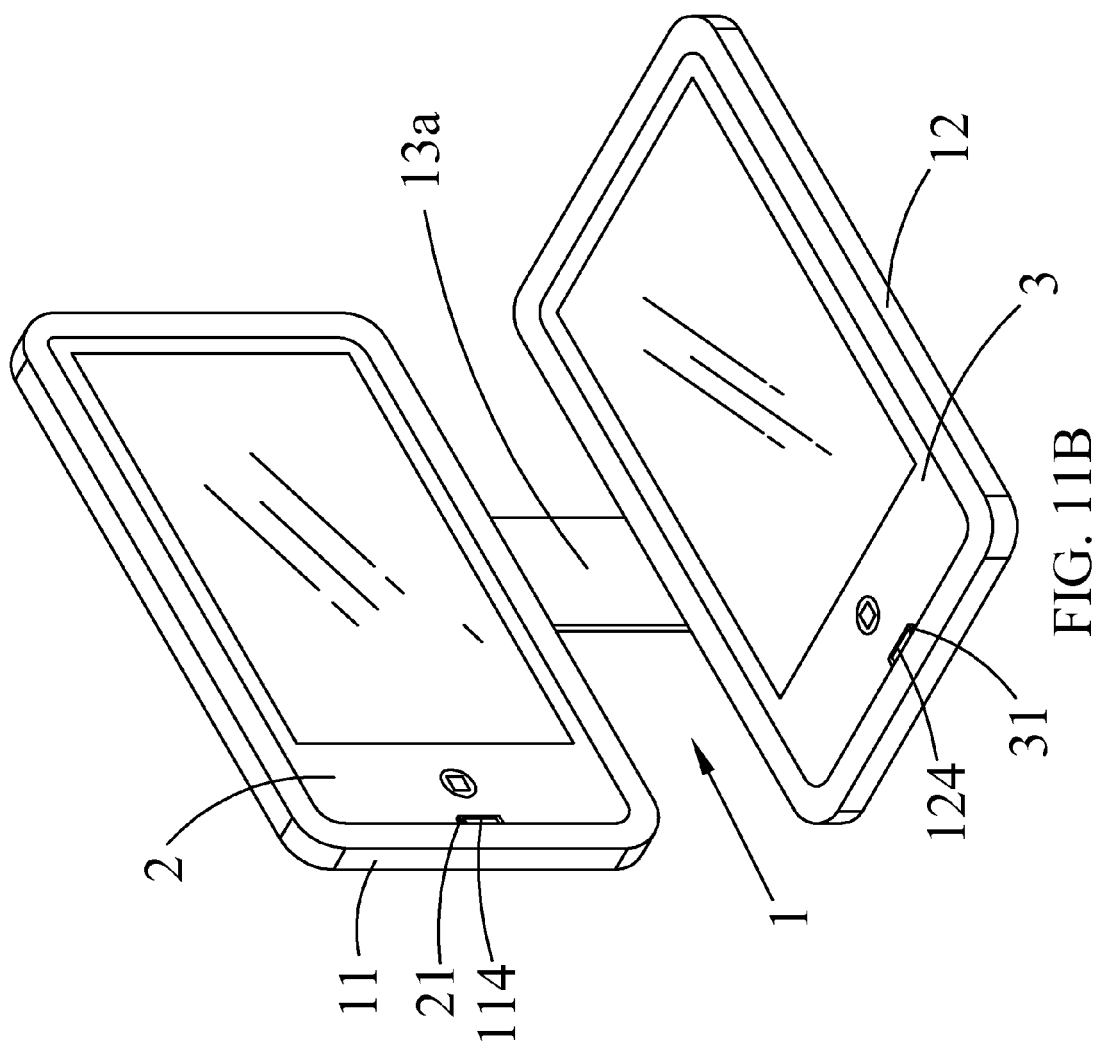
FIG. 11B is a schematic view of a stretched connective element of a holding device for mobile products in accordance with the ninth preferred embodiment of the present invention.
Figure 11C:
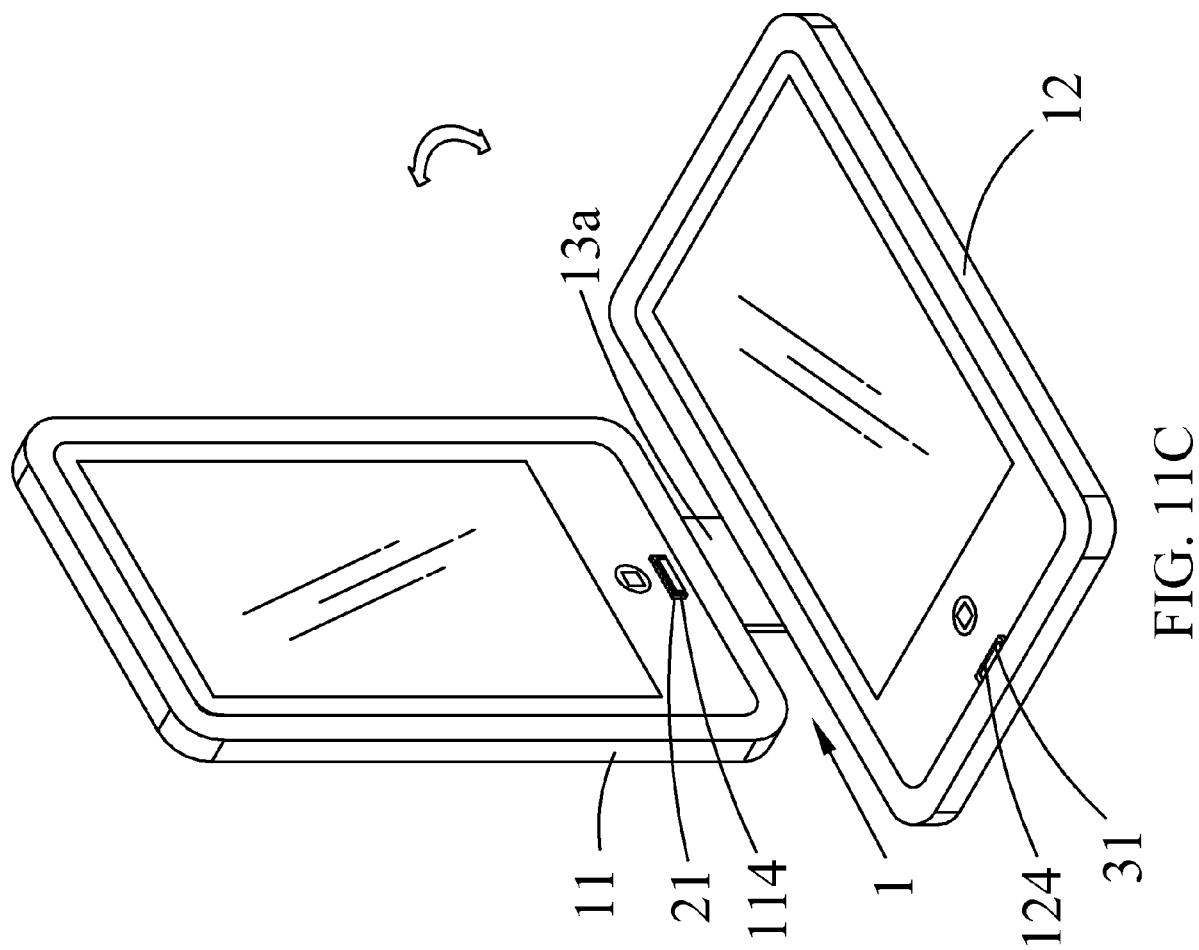
FIG. 11C is a schematic view of a turned-up first holding frame of a holding device for mobile products in accordance with the ninth preferred embodiment of the present invention.
Figure 12:
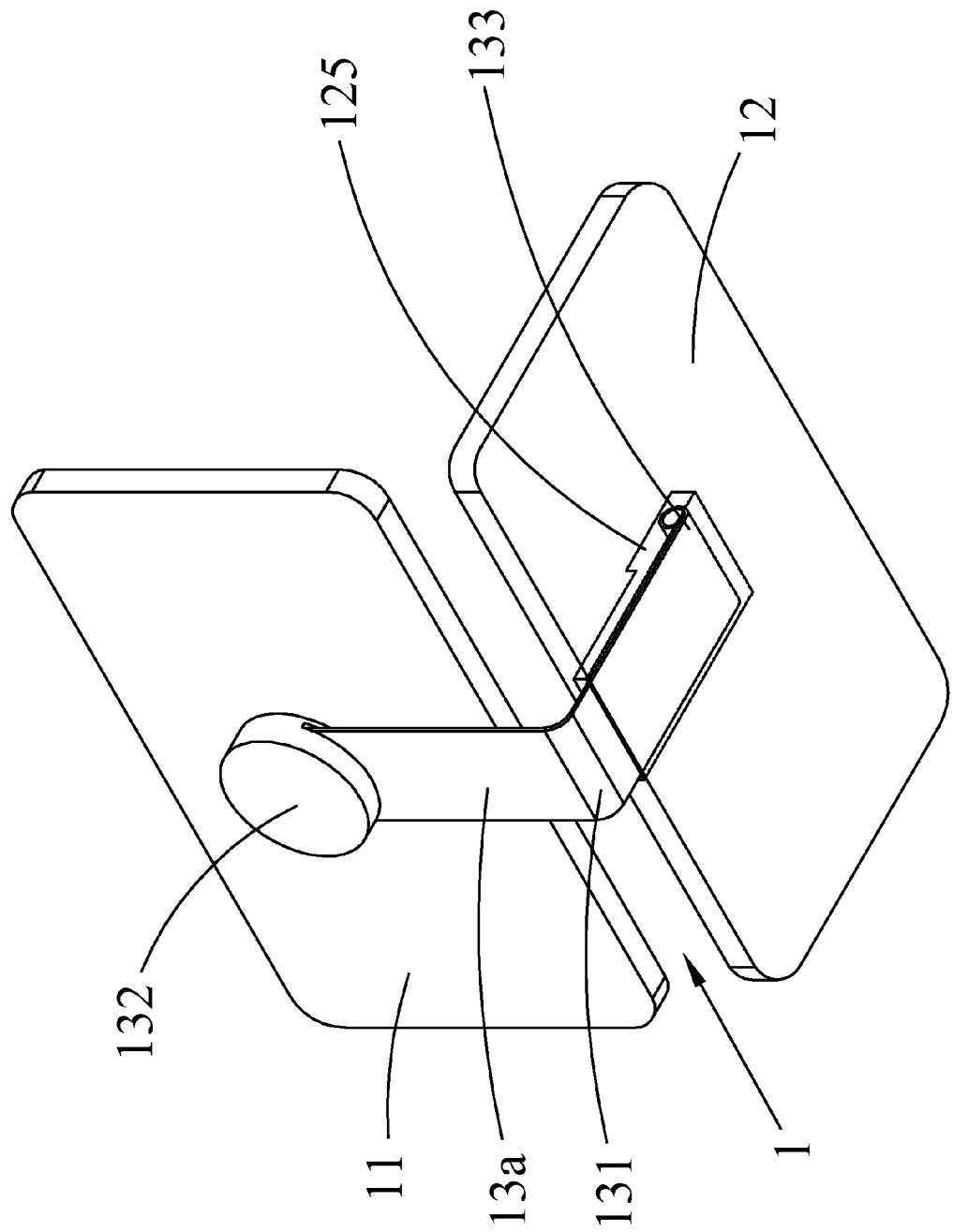
FIG. 12 is another schematic view of a holding device for mobile products in accordance with a ninth preferred embodiment of the present invention viewed from another angle.

FIGS. 11A to 11C show one way of using the present invention. In FIG. 11A, the first tablet PC 2 and the second tablet PC 3 are disposed in the first holding frame 11 and the second holding frame 12 respectively. Afterward, the first holding frame 11 is pulled outward, and the connective element main part 131 is stretched so that the distance between the first holding frame 11 and the second holding frame 12 is increased as shown in FIG. 11B. The first holding frame 11 is more convenient to rotate by users after the distance is increased for the reason that the rotation of the first holding frame 11 will not be interfered by the hindrance of the connective element main part 131, thus the first holding frame 11 can be erected vertically. With the characteristics of the connective element 13a of the present invention, the first holding frame 11 and the second holding frame 12 may have more flexibility on the spatial configuration to meet special requirements of the users. Of course, the first tablet PC 2 and the second tablet PC 3 are used as examples only, and users may connect any other mobile products with the holding device for mobile products according to the practical applications.

The first holding frame 11 and the second holding frame 12 are electrically connected by a wire connection or a wireless connection. The electric wire used for the wire connection is wrapped around the exterior or interior (not shown in the figure) of the first holding frame 11, the second holding frame 12 and the connective element 13a. For the wireless connection, wireless modules such as the Bluetooth modules can be disposed at the first holding frame 11 and the second holding frame 12, or an external screen connected through a wireless home digital interface (WHDI) can be adopted. However, the present invention is not limited to the aforementioned application of connection or variation of combination only.

Figure 13A:
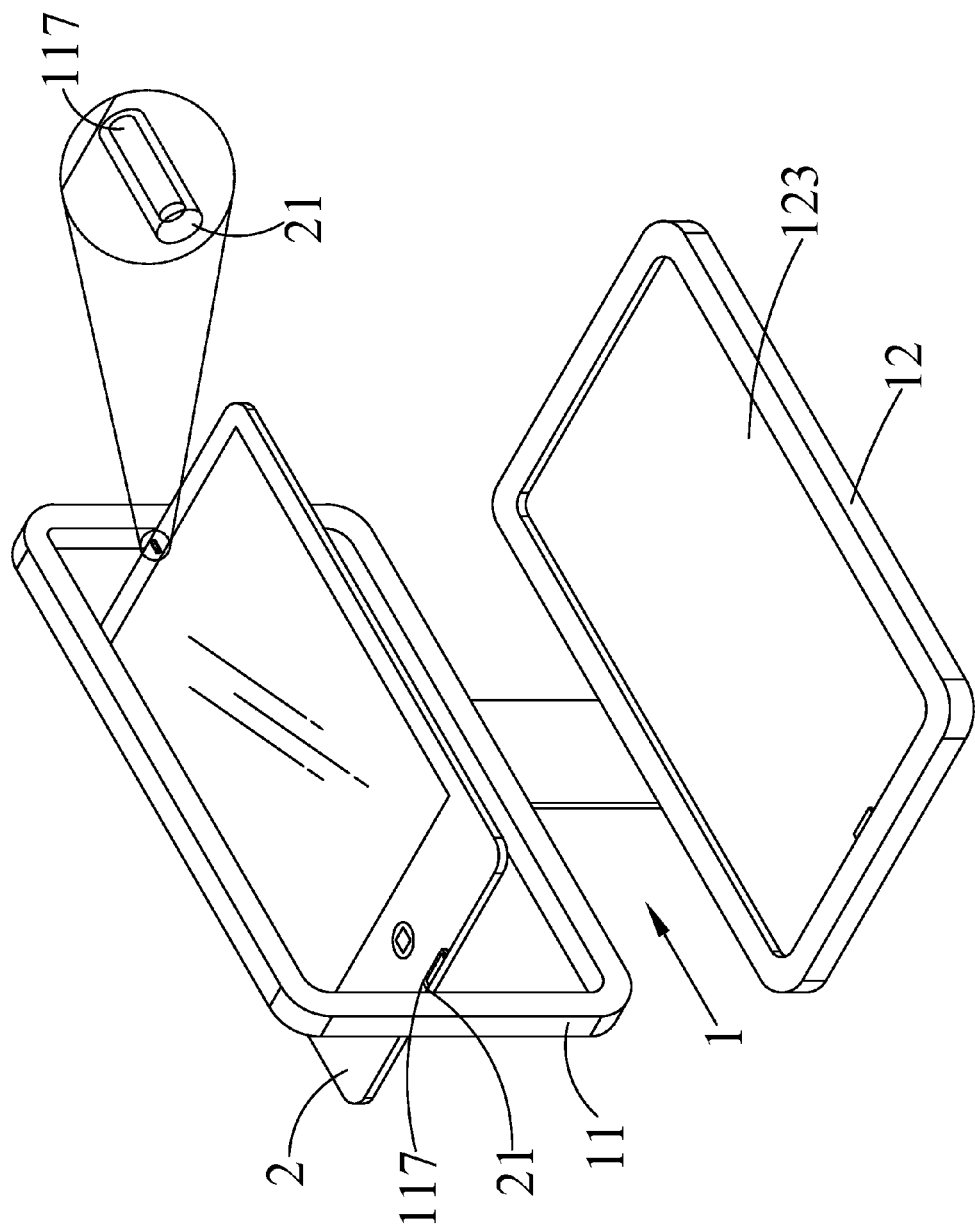
FIG. 13A is a schematic view of a first tablet PC being rotated in a holding device for mobile products in accordance with a tenth preferred embodiment of the present invention.
Figure 13B:
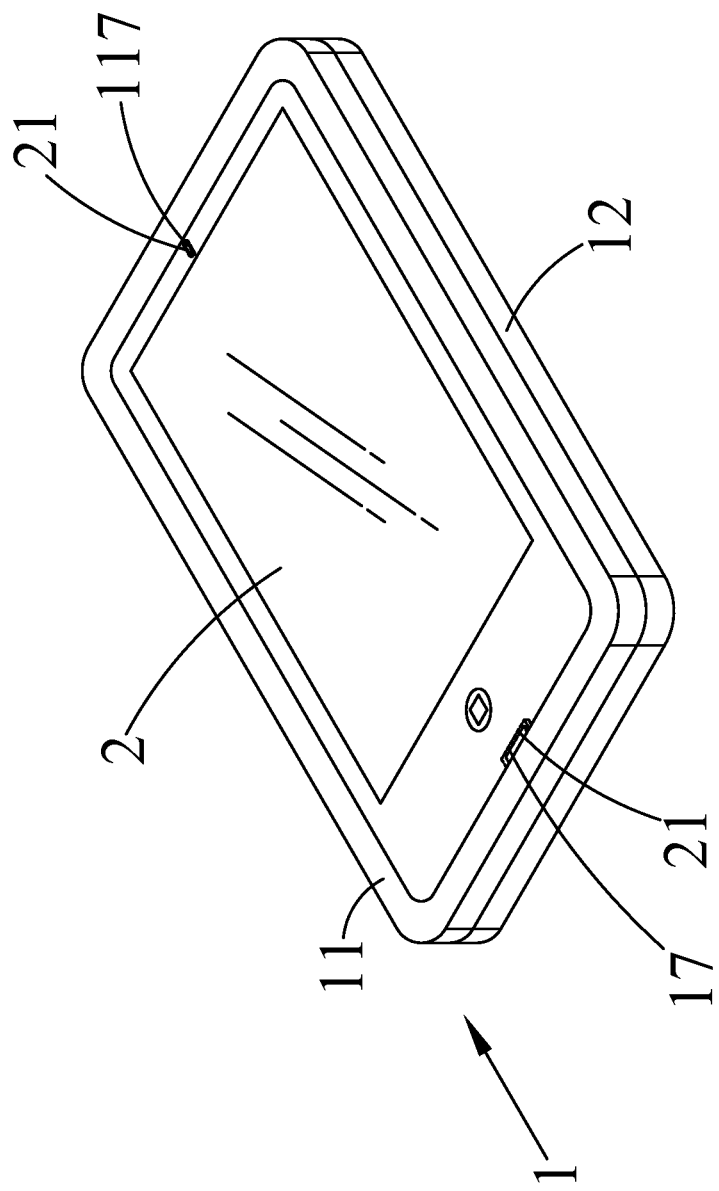
FIG. 13B is a schematic view of a closed state of the holding device for mobile products after the first tablet PC is rotated in accordance with the tenth preferred embodiment of the present invention.
Figure 13C:
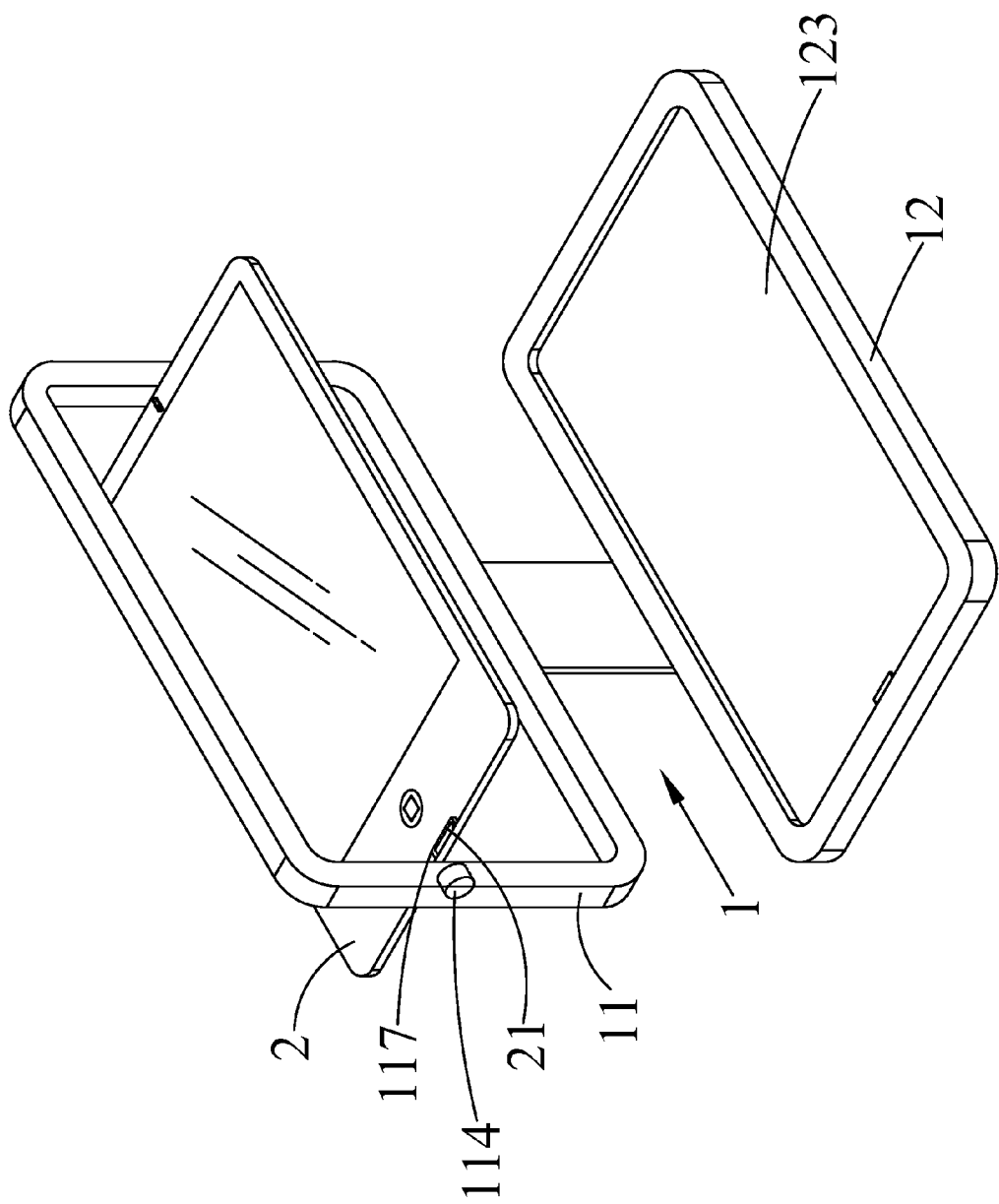
FIG. 13C is another schematic view of the first tablet PC being rotated in the holding device for mobile products in accordance with the tenth preferred embodiment of the present invention.

With reference to FIGS. 13A, 13B and 13C for schematic views of a first tablet PC being rotated in a holding device for mobile products, a closed state of the holding device for mobile products after the first tablet PC is rotated, and another first tablet PC being rotated in accordance with the tenth preferred embodiment of the present invention respectively, the first holding frame 11 is a hollow frame further comprising at least one connective element 117. The at least one connective element 117 can be a wire connective element or a wireless connective element. The wire connective element is electrically connected through a substantial circuit wire. The wireless connective element is not electrically connected through a substantial circuit wire, but is substantially connected. The at least one connective element 117 can be designed or modified as the practical needs, and the at least one connective element 117 can be rotatably disposed on at least one side of the hollow frame. In this preferred embodiment, the first holding frame 11 has connective elements 117 disposed respectively on both left and right sides, and the connective elements 117 can be rotatably disposed at the first holding frame 11. Two interfaces 21 are arranged on both sides of the first tablet PC 2 respectively in this preferred embodiment. In this preferred embodiment, the first holding frame 11 is substantially connected to the two interfaces 21 of the first tablet PC 2 through the connective elements 117 on both sides respectively. The structure with a simple design facilitates the downward rotation of the first tablet PC 2. Furthermore, the first holding frame 11 has a first port 114, and one of the connective elements 117 can be further connected to the first port 114. After the interfaces 21 are connected to the connective elements 117, the first tablet PC 2 can be rotated in the condition of being connected to the first holding frame 11 as shown in FIG. 13A. Therefore, when the first holding frame 11 and the second holding frame 12 are closed, the first tablet PC 2 can be arranged upward or downward according to requirement of the users. However, the hollow frame of the first holding frame 11 of this preferred embodiment is used as an example for illustrating the invention only, and any other equivalent structures can be applied to the second holding frame 12 as well.

Figure 14A:
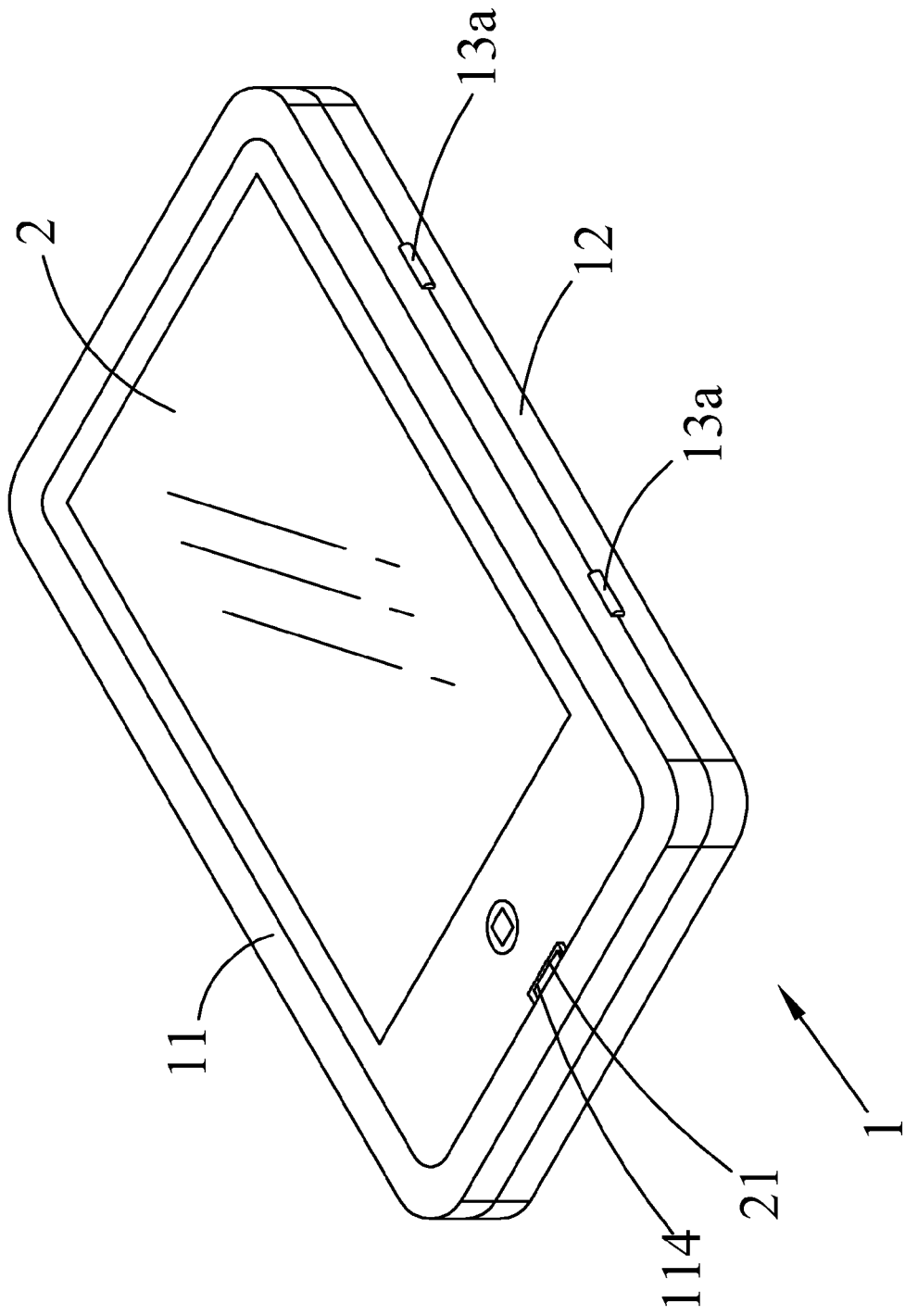
FIG. 14A is a schematic view of a closed state of a holding device for mobile products with a first tablet PC and a second tablet PC facing the same direction in accordance with an eleventh preferred embodiment of the present invention.
Figure 14B:
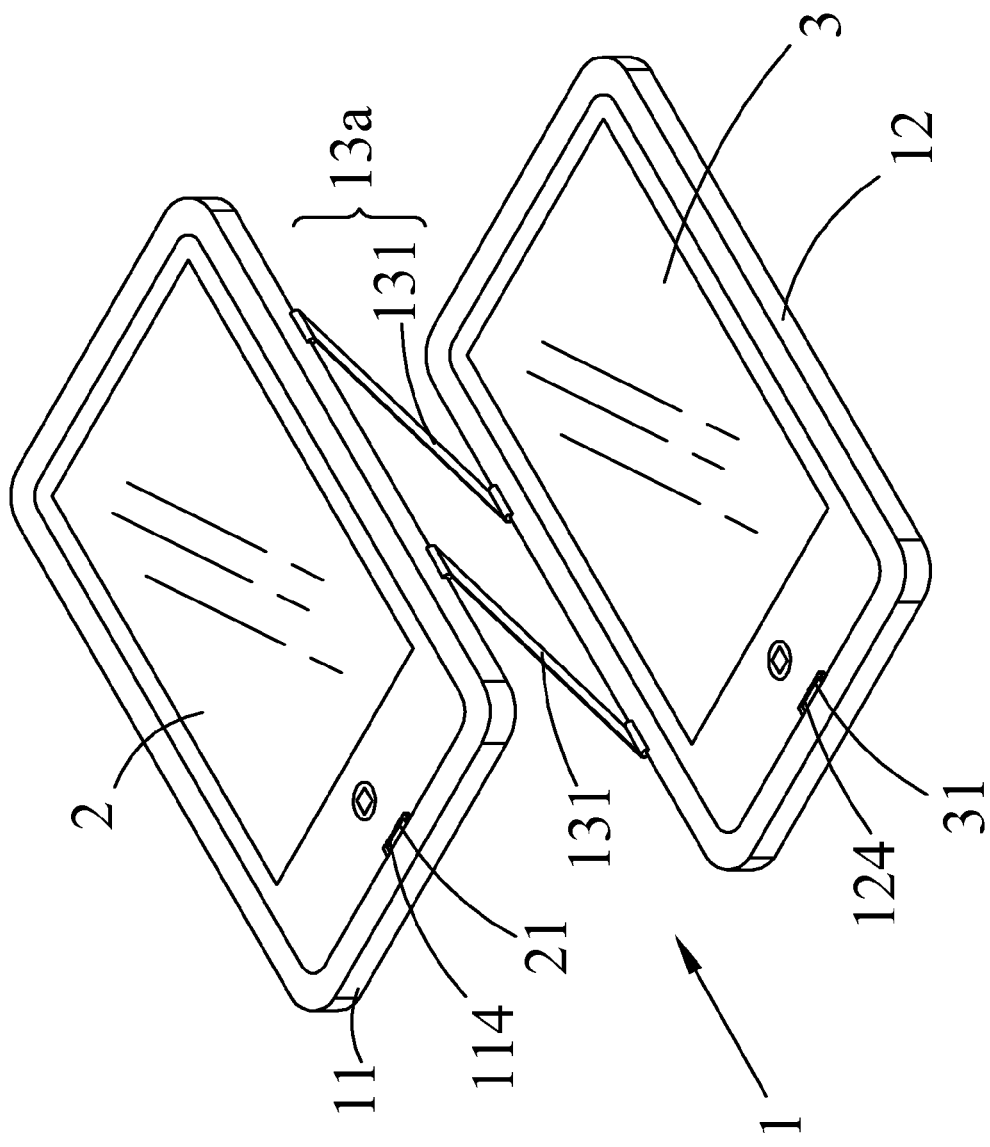
FIG. 14B is a schematic view of moving the first holding frame with respect to the second holding frame of the holding device for mobile products in accordance with the eleventh preferred embodiment of the present invention.
Figure 14C:
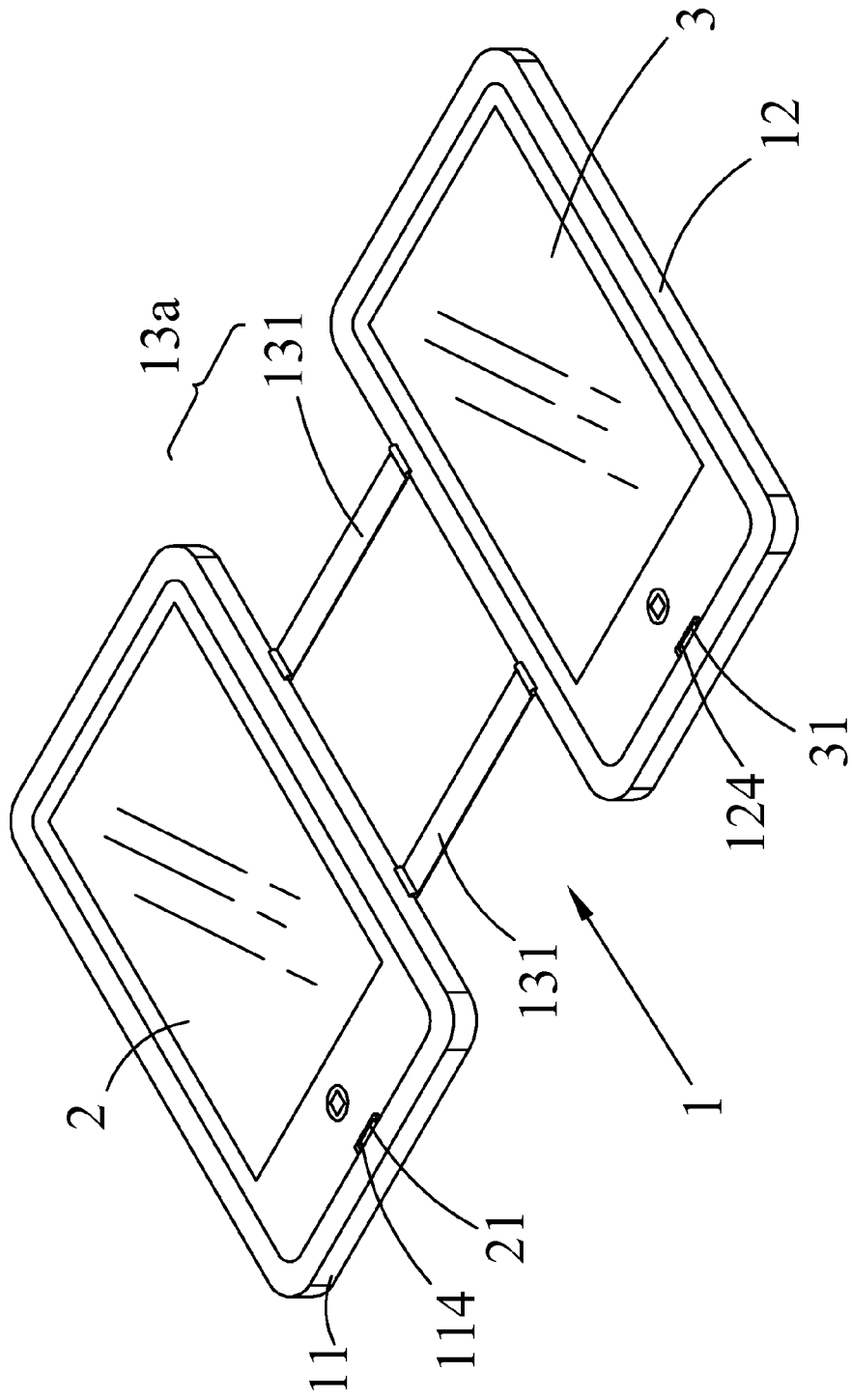
FIG. 14C is a schematic view of spreading the first holding frame and the second holding frame of the holding device for mobile products on a level with the first tablet PC and the second tablet PC facing in parallel direction(s) in accordance with the eleventh preferred embodiment of the present invention.
Figure 14D:
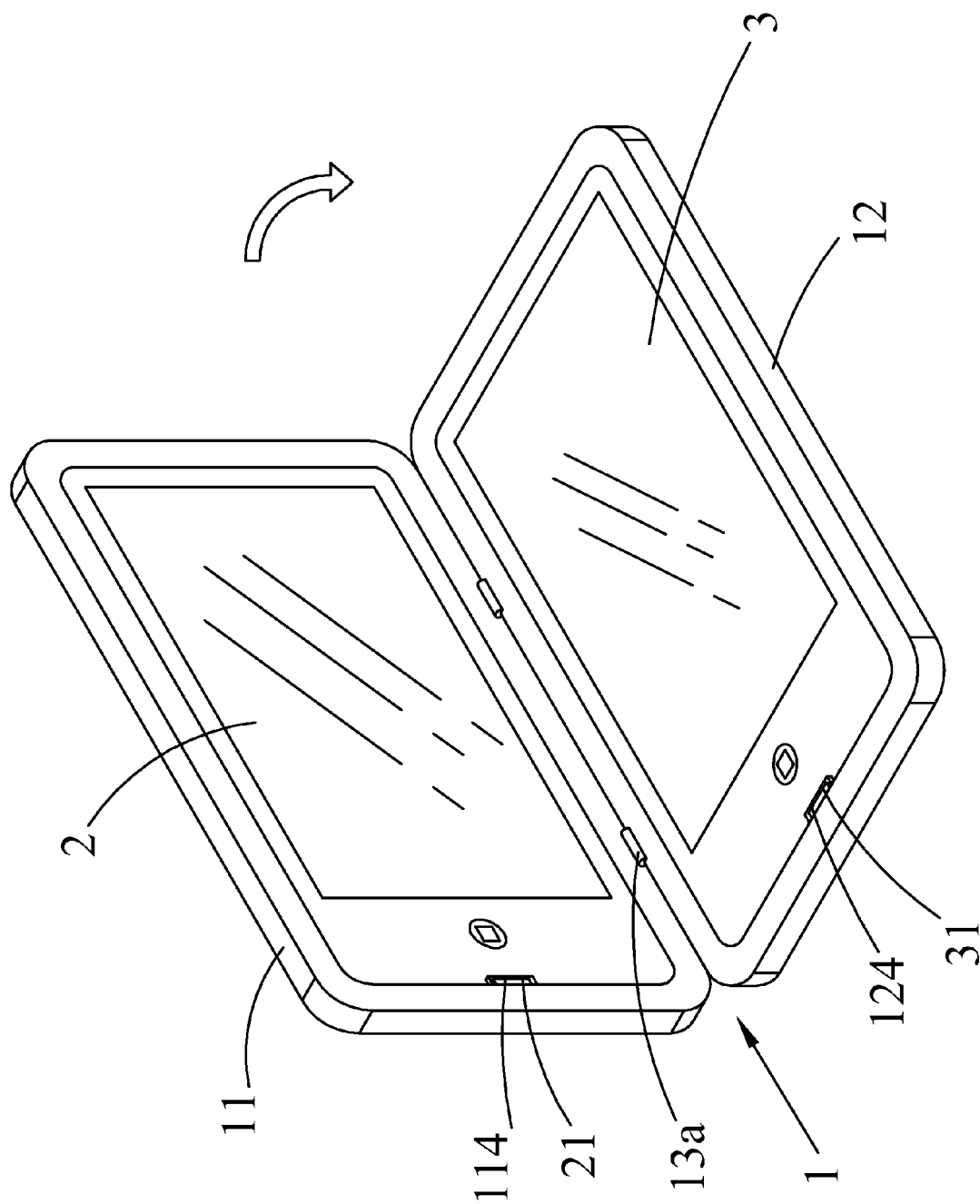
FIG. 14D is a schematic view of folding up the first holding frame and the second holding frame of the holding device for mobile products in the direction of causing the fronts of the first tablet PC and the second tablet PC to face each other in accordance with the eleventh preferred embodiment of the present invention.
Figure 14E:
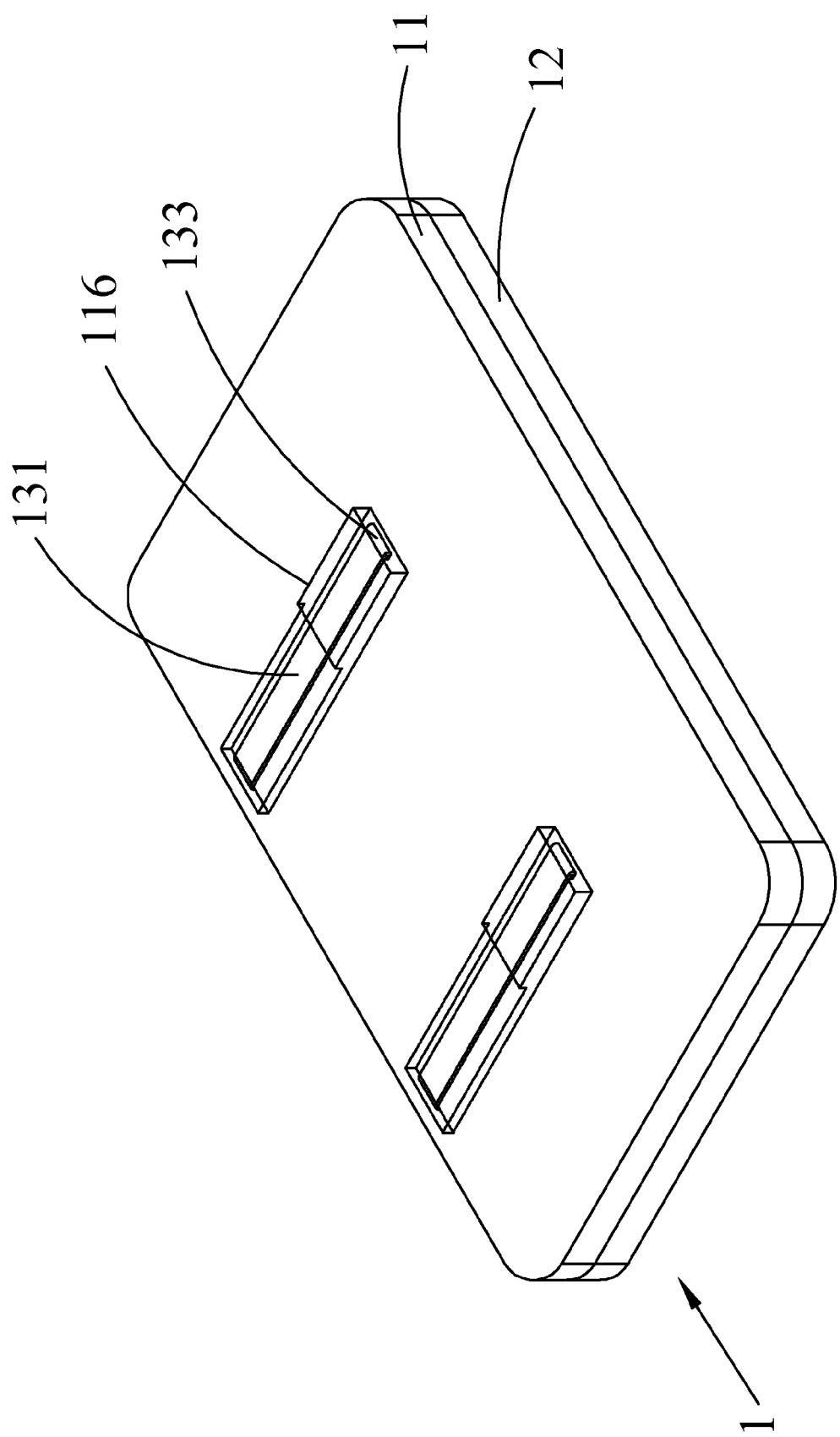
FIG. 14E is a schematic view of a closed state of the holding device for mobile products with the fronts of the first tablet PC and the second tablet PC facing each other in accordance with the eleventh preferred embodiment of the present invention.

With reference to FIGS. 14A to 14E for schematic views of a closed state of a holding device for mobile products with a first tablet PC and a second tablet PC facing the same direction, moving the first holding frame with respect to the second holding frame, spreading the first holding frame and the second holding frame on a level with the first tablet PC and the second tablet PC facing in parallel direction(s), folding up the first holding frame and the second holding frame in the direction of causing the fronts of the first tablet PC and the second tablet PC to face each other, and a closed state of the holding device for mobile products with the fronts of the first tablet PC and the second tablet PC facing each other of a holding device for mobile products in accordance with the eleventh preferred embodiment of the present invention respectively, the holding device for mobile products 1 comprises a first holding frame 11, a second holding frame 12 and at least one connective element 13a. The at least one connective element 117 can be a wire connective element or a wireless connective element. The wire connective element is electrically connected through a substantial circuit wire. The wireless connective element is not electrically connected through a substantial circuit wire, but is substantially connected. The first holding frame 11 is connected to the second holding frame 12 through the connective element 13a. In this preferred embodiment, the structures of the first holding frame 11 and the second holding frame 12 are similar to that of the second holding frame 12 of the ninth preferred embodiment. A stretching concavity 116 and a stretching concavity 125 are formed on sides of the first holding frame 11 and the second holding frame 12 respectively. The direction of the disposition of the stretching concavity 116 is parallel to the bottom of the first holding frame 11 and extended to the other side corresponding to the opening of the stretching concavity 116. Furthermore, the direction of disposition of the stretching concavity 125 is parallel to the bottom of the second holding frame 12 and extended towards the other side corresponding to the opening of the stretching concavity 125. The quantity of the connective elements 13a is equal to two in this preferred embodiment, and each the connective element 13a includes a connective element main part 131 and two stretch ends 133, so that both the stretch ends 133 of each connective element main part 131 allow the connective element main part 131 to be flexibly disposed in the stretching concavity 116 of the first holding frame 11 and/or the stretching concavity 125 of the second holding frame 12. When a portion of the connective element main part 131 is pulled and stretched beyond the stretching concavity 116 or stretching concavity 125, the first holding frame 11 and the second holding frame 12 of the holding device for mobile products 1 are separated with a distance apart with each other as shown in FIGS. 14A to 14C. When a portion of the connective element main part 131 is retracted into the stretching concavity 116 and the stretching concavity 125, the distance between the first holding frame 11 and the second holding frame 12 of the holding device for mobile products 1 is decreased as shown in FIGS. 14D and 14E. In this preferred embodiment, the first holding frame 11 and the second holding frame 12 are provided with a stretching concavity 116 and a stretching concavity 125 respectively. However, the stretching concavity can be formed only in the first holding frame 11 or the second holding frame 12 according to the practical need. A portion of the connective element main part 131 can be stretched out of the stretching concavity 116 or the stretching concavity 125, and a portion of the connective element main part 131 can be retracted into the stretching concavity 116 or the stretching concavity 125.

With reference to FIGS. 14A to 14E for the use of the holding device for mobile products of the present invention, FIG. 14A shows that the first holding frame 11 and the second holding frame 12 are stacked in the same direction, and the surface of the first tablet PC 2 disposed in the first holding frame 11 is aligned upward to facilitate users to use the first tablet PC 2 directly when holding the holding device for mobile products by hands. FIG. 14B shows the relative movement of the first holding frame 11 with respect to the second holding frame 12 when the first holding frame 11 is moving upward. FIG. 14C shows that the first holding frame 11 and the second holding frame 12 are spread in the same plane, and the surface of the first tablet PC 2 disposed in the first holding frame 11 as well as the surface of the second tablet PC 3 disposed in the second holding frame 12 are aligned upward. FIG. 14D shows that the connective element main part 131 is retracted into the stretching concavity 116 and the stretching concavity 125, and the first holding frame 11 and the second holding frame 12 are situated adjacent to one another to form an included angle to facilitate users to use. FIG. 14E shows that the first holding frame 11 and the second holding frame 12 are closed in the same direction to facilitate users to store and carry the holding device for mobile products.

In summary of the description above, the holding device for mobile products can achieve the purpose of expansion function by connecting a plurality of mobile products. For example, a tablet PC is connected, and then another electronic device such as another tablet PC is connected to meet the user's visual requirement or provide the convenient operation, an external power supply is connected as a backup power source in case of contingency, and an external audio device is connected to satisfy the user requirement for visual enjoyment. Of course, a tablet PC, a power supply, an audio device or other combinations can be added to the application of the present invention.

While the invention has been described by means of specific embodiments, numerous modifications and variations could be made thereto by those skilled in the art without departing from the scope and spirit of the invention set forth in the claims.

What is claimed is:

1. A holding device for holding mobile products, comprising:
   a first holding frame having a first containing groove on which a first port is disposed, wherein the first port is configured to connect the first holding frame and a first mobile product;
   a second holding frame having a second containing groove on which a second port is disposed, wherein the second port is configured to connect the second holding frame and a second mobile product; and
   at least one connective element configured to electrically connect the first holding frame and the second holding frame;
   wherein when the first holding frame and the second holding frame are electrically connected, the first mobile product in the first containing groove and the second mobile product in the second containing groove are capable of being electrically connected through their connection to the first holding frame and the second holding frame respectively.

2. The holding device of claim 1, wherein the first holding frame further comprises at least two parts fit to be assembled into a first unit, and a first connective portion fit to connect the two parts, and the first containing groove is to be formed by putting together the two parts of the first holding frame.

3. The holding device of claim 1, wherein the second holding frame further comprises at least two parts fit to be assembled into a second unit, and a second connective portion fit to connect the two parts, and the second containing groove is to be made by putting together the two parts of the second holding frame.

4. The holding device of claim 1, wherein the first holding frame or the second holding frame further has a support stand on which the first holding frame or the second holding frame is placed or disposed.

5. The holding device of claim 1, wherein the connective element comprises a connective element main part and has a pivot part fit to be disposed on an end of the connective element main part and on which the first holding frame or the second holding frame is fit to turn.

6. The holding device of claim 1, wherein the connective element comprises a connective element main part and has a stretch end fit to be disposed in at least one stretch concavity formed on a side of the second holding frame.

7. The holding device of claim 6, wherein the stretch end is coupled to an inside wall of the stretch concavity, a retracting mechanism is disposed on the inside wall, and the retracting mechanism enables selectively stretching or retracting the connective element main part in the stretch concavity to adjust a length of the connective element main part beyond the stretch concavity.

8. A holding device for holding mobile products, comprising:
   a first holding frame for holding a first mobile product; and
   a second holding frame for holding a second mobile product;
   wherein the first holding frame and the second holding frame are configured to be electrically connected with each other by a wire connection or a wireless connections;
   wherein the first holding frame has a first containing groove on which a first port is disposed, the first port being configured to connect the first holding frame and the first mobile product; the second holding frame has a second containing groove on which a second port is disposed, the second port being configured to connect the second holding frame and the second mobile product; and the holding device further comprises at least one connective wire element configured to make an electrical wire connection between the first holding frame and the second holding frame.

9. The holding device of claim 8, wherein for the first holding frame and the second holding frame to be electrically connected by the wireless connection, the holding device further comprises at least one connective wireless element including a connective wireless element main part and a pivot part fit to be disposed on an end of the connective wireless element main part and on which the first holding frame or the second holding frame is fit to turn.

10. The holding device of claim 8, wherein for the first holding frame and the second holding frame to be electrically connected by the wireless connection, the holding device further comprises at least one connective wireless element including a connective wireless element main part and has a stretch end fit to be disposed in at least one stretch concavity formed on a side of the second holding frame.

11. The holding device of claim 10, wherein the stretch end is coupled to an inside wall of the stretch concavity, a retracting mechanism is disposed on the inside wall, and the retracting mechanism enables selectively stretching or retracting the connective wireless element main part in the stretch concavity to adjust a length of the connective wireless element main part beyond the stretch concavity.

12. The holding device of claim 8, wherein the first holding frame comprises a hollow frame having at least one connective wireless element rotatably disposed on at least one side of the hollow frame.

13. The holding device of claim 8, wherein the connective wire element comprises a connective wire element main part and has a pivot part fit to be disposed on an end of the connective wire element main part and on which the first holding frame or the second holding frame is fit to turn.

14. The holding device of claim 8, wherein the connective wire element includes a connective wire element main part and has a stretch end fit to be disposed in at least one stretch concavity formed on a side of the second holding frame.

15. The holding device of claim 14, wherein the stretch end is coupled to an inside wall of the stretch concavity, a retracting mechanism is disposed on the inside wall, and the retracting mechanism enables selectively stretching or retracting the connective wire element main part in the stretch concavity to adjust a length of the connective wire element main part beyond the stretch concavity.

16. The holding device of claim 8, wherein the first holding frame comprises a hollow frame having the connective wire element rotatably disposed on at least one side of the hollow frame.

17. The holding device of claim 16, wherein the first port is coupled to the connective wire element and rotatably disposed on the at least one side of the hollow frame.

18. A holding device for holding mobile products, comprising:
- a plurality of holding frames, each having a containing groove on which a port is disposed, wherein the port is configured to connect each said holding frame and an interface of a mobile product; and
- a plurality of connective elements configured to electrically connect the plurality of holding frames;
- wherein when the holding frames are electrically connected, the mobile products in respective containing grooves of the holding frames are capable of being electrically connected through their connection to the holding frames respectively so as to add functionality to each of the mobile products.

19. The holding device of claim 18, wherein one of the holding frames further comprises at least two parts fit to be assembled into a unit, and a connective portion fit to connect the two parts, and the containing groove of said one holding frame is to be formed by putting together the two parts.

* * * * *